(12) United States Patent
Warnaar

(10) Patent No.: US 11,436,240 B1
(45) Date of Patent: Sep. 6, 2022

(54) SYSTEMS AND METHODS FOR MAPPING REAL ESTATE TO REAL ESTATE SEEKER PREFERENCES

(71) Applicant: Kathleen Warnaar, Raleigh, NC (US)

(72) Inventor: Kathleen Warnaar, Raleigh, NC (US)

( * ) Notice: Subject to any disclaimer, the term of this patent is extended or adjusted under 35 U.S.C. 154(b) by 0 days.

(21) Appl. No.: 17/365,132

(22) Filed: Jul. 1, 2021

Related U.S. Application Data

(60) Provisional application No. 62/705,545, filed on Jul. 3, 2020.

(51) Int. Cl.
| | |
|---|---|
| *G06F 16/24* | (2019.01) |
| *G06Q 50/16* | (2012.01) |
| *G06F 16/2457* | (2019.01) |
| *G06F 16/58* | (2019.01) |

(52) U.S. Cl.
CPC .... *G06F 16/24578* (2019.01); *G06F 16/5866* (2019.01); *G06Q 50/16* (2013.01)

(58) Field of Classification Search
CPC .......... G06F 16/24578; G06F 16/5866; G06Q 50/16
See application file for complete search history.

(56) References Cited

U.S. PATENT DOCUMENTS

| | | |
|---|---|---|
| 8,032,480 B2 | 10/2011 | Pinckney et al. |
| 8,195,668 B2 | 6/2012 | Drennan et al. |
| 8,515,839 B2 | 8/2013 | Ma et al. |
| 8,666,909 B2 | 3/2014 | Pinckney et al. |
| 8,676,680 B2 | 3/2014 | Humphries et al. |
| 9,361,583 B1* | 6/2016 | Holloway ................ G06N 5/02 |
| 9,424,305 B1 | 8/2016 | Puttick |
| 9,605,704 B1 | 3/2017 | Humphries et al. |
| 9,678,957 B2 | 6/2017 | Cormack et al. |
| 10,185,917 B2 | 1/2019 | Greystoke et al. |
| 10,460,406 B1* | 10/2019 | Humphries ............ G06Q 50/16 |
| 10,621,610 B2 | 4/2020 | Madden |
| 2007/0043770 A1* | 2/2007 | Goodrich .......... G06F 16/24578 |
| 2007/0185727 A1* | 8/2007 | Ma ........................ G06Q 50/16 |
| | | 705/306 |
| 2014/0358943 A1* | 12/2014 | Raymond .............. G06Q 10/10 |
| | | 707/748 |
| 2015/0356576 A1* | 12/2015 | Malaviya ........... G06Q 30/0202 |
| | | 705/7.31 |
| 2017/0124487 A1 | 5/2017 | Szeto et al. |
| 2017/0365019 A1* | 12/2017 | He ..................... G06F 16/9038 |
| 2018/0082183 A1 | 3/2018 | Hertz et al. |
| 2018/0150205 A1 | 5/2018 | Rad et al. |

\* cited by examiner

*Primary Examiner* — Stephen S Hong
*Assistant Examiner* — Ahamed I Nazar
(74) *Attorney, Agent, or Firm* — Erise IP, P.A.

(57) ABSTRACT

Systems and methods are described that provide for determining a relative non-monetary value of real estate properties and translating seeking users' real estate needs into user-specific criteria that can be incorporated in searches and optimize real estate search results based on the seeking users' needs for both real estate seeking users and real estate offering users. Seeking users may be evaluated for user-specific needs and receiver recommendations for real estate to purchase, lease, use, or occupy for highest and best use of available real estate. Furthermore, real estate matching seeking users' needs may be presented to an offering user. The offering user may update any real estate listings to match the needs of the seeking user as well as needs of other seeking users to target specific users or gain more interested users.

19 Claims, 22 Drawing Sheets

SYSTEMS AND METHODS FOR MAPPING REAL ESTATE TO REAL ESTATE SEEKER PREFERENCES

RELATED APPLICATIONS

This application claims priority benefit of U.S. Provisional Patent Application No. 63/705,545 filed Jul. 3, 2020, and entitled "REAL ESTATE RELATIONSHIP MANAGER," which is herein incorporated by reference in its entirety.

BACKGROUND

1. Field

Embodiments of the invention generally relate to real estate, and more particularly to assisting users interested in a transaction that achieves highest and best use of real estate property.

2. Related Art

Typically, real estate professionals employ explicit needs of a seller by listing and marketing a real estate property to a pool of unknown buyers. Marketing consists of enumerating the property by explicit data such as type, size, price, age, construction, and other typical features with some "puffing" written in by the real estate professional. Real estate professionals employ explicit needs of a buyer gained through interviewing a buyer to initiate searches of real estate listings and typically provide electronic reports from automated real estate listing searches. Buyers and agents search for suitable properties by searching the enumerated features, and the buyers may make decisions about viewing properties based on location, pictures, or the "puffing" statements.

Typical online real estate companies provide the same model as described above, on the internet. The online companies provide users with capabilities to search real estate listings based on limited standardized requirement choices entered by the user. Online real estate companies retain the user's information and gain additional estimated level of interest by use of a user's internet browsing activities sometimes without the user's explicit awareness. Online real estate companies then interact with the customer via website and phone app alerts, emails, texts, and web browsing advertisements. The user is subjected to a high volume of unsolicited online interaction for the goal of providing real estate professionals and real estate related companies with referrals or other information that can be monetized. Users are unable to control the extent of the monitoring of their browsing behavior or other data collected on them which has led to an increasing resistance and negative feeling about the loss of privacy and the intrusive nature of repetitive advertising. This in turn has led to an increasing user pushback against providing online real estate companies with personally identifiable information that could make them a target of undesirable advertising and junk mail instigated by online real estate companies, their affiliates, and companies that purchased their data. The net result is that online real estate companies fail to serve the best interest of users. Furthermore, only limited tools are available to users to assess whether their current real estate use achieves a highest and best use of real estate or whether there are real estate alternatives on the market that do.

Typical real estate matching systems limit to standardized criteria used for all properties. Limiting real estate listing systems to standardized criteria used for all properties provides only limited utility for evaluating implicit factors influencing a buyer's decision to engage in a transaction with the seller. Buyers, with or without a real estate professional, select standardized criteria found in industry listing services such as number of bedrooms, number of bathrooms, garage, location, and price. The buyer then receives one or more recommendations of real estate property listed on industry listing services that matches or closely matches a buyer's criteria selection. The buyer or their agent must then evaluate each home for its usefulness, appeal, or desirability to the buyer. The clear metric is the number of matches of a home's features to a buyer's search criteria.

Another drawback of existing real estate listing systems is that the value of the property is generally expressed in monetary terms such as price or leasing costs that are based on the estimated highest and best use of the land plus any improvements. The price or leasing costs are offered to everyone equally. However, for most people the real estate value is incompatible with the offered price or leasing cost because the real estate property fails to present a highest and best use for them. A buyer may rate homes differently based on their needs for highest and best use; however, the price of the property is constant for everyone.

Another drawback of current real estate listing systems is that there are no effective methods for determining the value of the property based on buyers' demand for the property's features. The asking price is therefore most strongly related to the seller's perceived value of the property. Some sellers think their house is worth more than what buyers are willing to pay while some buyers are willing to pay more than the seller is asking. Overpricing has unintended punitive results for the seller from lengthy "days on market" statistics, price adjustments up or down, or previous listing engagements that did not result in a sale. Underpricing may lead to a bidding war that may benefit the seller but may lead to irrational decisions by buyers.

Users interested in selling, buying, leasing, using, or occupying real estate property may have conflicting and concurrent goals for their future real estate relationship. Users want to easily search, identify, and compare real estate offerings in order to obtain the real estate property needed for their highest and best use. Users have explicit and implicit needs that they try to meet with their real estate search that are not met with the current real estate systems. Examples of explicit needs are a specific city or area, proximity to points of interest, price range, return on investment, potential risk factors and home features such as size, style, and age. Implicit needs are opinions and unvoiced priorities that are usually offered or apparent as the person or business considers, views, or compares real estate property in detail. Implicit needs may vary depending on real estate opportunity, such as previously unrealized tradeoffs or a change in priority that will be acceptable when presented with real estate comparisons.

What is needed is a platform that incorporates a method for determining the relative non-monetary value of real estate properties and translating users' real estate needs into user-specific criteria that can be incorporated in searches, with multiple streams for criteria, thus enhancing users' personal control. Users are increasingly sophisticated in making decisions on real estate transactions and increasingly active and willing participants in locating properties of interest to them or in marketing properties of interest to others. These users may choose to interact with a method that provides them an ability to evaluate real estate properties offered for purchase, lease, use, or occupation for highest and best use without loss of privacy and receiving a volume of advertisements. A centralized, persistent, and private evaluation system may then be capable of providing recommendations based on a user's explicit and implicit needs that can benefit the user's objective of achieving highest and best use of real estate property.

SUMMARY

Embodiments of the invention address the above-described need by providing systems and methods that incorporate novel techniques for providing users with options for real estate transactions that achieve highest and best real estate use or benefit. A real estate seeker (i.e., seeking user) may provide data on the user's real estate needs from a plurality of data sources. This user provided data may then be characterized to determine the user's explicit and implicit needs for real estate use or benefit and this characterization may be stored in at least one real estate relationship profile. The at least one real estate relationship profile may then be used to identify other users offering real estate properties (i.e., offering users) that have the highest probability of achieving the seeking user's real estate relationship profile goals. The collection of real estate relationship profiles of a plurality of seeking users may be used by an offering user offering real estate property to identify seeking users that have the highest probability of meeting the seeking users' real estate relationship profile goals.

In particular, a first embodiment is directed to one or more non-transitory computer readable media storing computer-executable instructions that, when executed by a processor, performs a method of determining non-monetary value of a real estate transaction and matching real estate property to attributes of a real estate seeker. In some embodiments, the method comprises the steps of receiving user data comprising explicit needs of the real estate seeker, determining implicit needs of the real estate seeker, receiving explicit real estate data indicative of available real estate, determining implicit real estate data, comparing real estate data indicative of the available real estate to the explicit needs and the implicit needs of the real estate seeker, determining a plurality of real estate property options based on the comparison, and causing display of the plurality of real estate options to the real estate seeker.

A second embodiment is directed to a method of determining non-monetary value of a real estate transaction and matching real estate property to attributes of a real estate seeker. In some embodiments, the method comprises the steps of receiving user data comprising explicit needs of the real estate seeker, determining implicit needs of the real estate seeker, receiving explicit real estate data indicative of available real estate, determining implicit real estate data, comparing real estate data indicative of the available real estate to the explicit needs and the implicit needs of the real estate seeker, determining a plurality of real estate property options based on the comparison, and causing display of the plurality of real estate options to the real estate seeker.

A third embodiment is directed to a system for determining non-monetary value of a real estate transaction and matching real estate property to attributes of a real estate seeker, the system comprising a data store, a processor, one or more non-transitory computer readable media storing computer-executable instructions that, when executed by the processor, performs a method of determining the non-monetary value of the real estate transaction and matching the real estate property to the attributes of the real estate seeker. In some embodiments, the method comprises the steps of receiving user data comprising explicit needs of the real estate seeker, determining implicit needs of the real estate seeker, receiving real estate data indicative of available real estate, comparing the real estate data indicative of the available real estate to the explicit needs and the implicit needs of the real estate seeker, determining a plurality of real estate property options based on the comparison, and causing display of the plurality of real estate property options to the real estate seeker.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTIONS OF THE DRAWING FEATURES

Embodiments of the invention are described in detail below with reference to the attached drawing figures, wherein.

Figure 1:
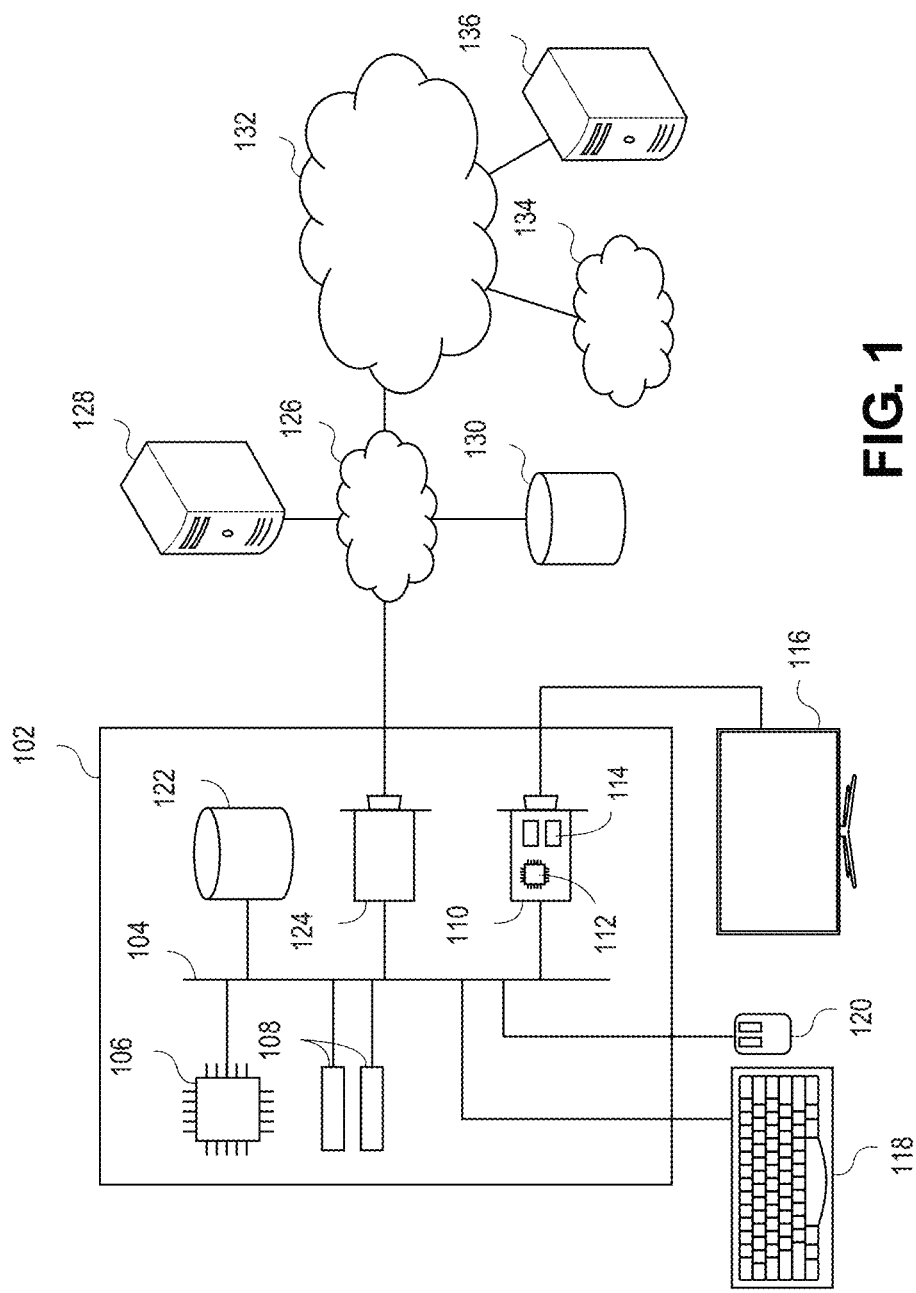
FIG. 1 depicts an exemplary hardware platform for certain embodiments of the invention.

The drawings do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention provide systems and methods that determine relative non-monetary value of a real estate transaction based on a seeking user's goals for highest and best use of real estate property. The seeking user's implicit needs and explicit needs may be compared to available real estate data and optimized to provide highest and best use for the seeking user. The explicit needs and the implicit needs may provide both monitory and non-monitory benefits to the seeking user and offering user and any service provider providing a service to the agent or seller of the real estate. The transaction may involve the purchase, lease, use or otherwise occupation of the real estate, and may provide a service that enables the user to achieve highest and best use of the real estate. In some embodiments, the highest and best use of a property may be to sell, lease, or rent the property.

The seeking user may provide data for evaluating the user's compatibility with the user's goals for the real estate. The user provided data may include user data such as, for example, user objectives for real estate use, the user's real estate history, user selected pictures, user specified preferences, user specified connections such as, for example, specific locations, businesses, entertainment, previous addresses, points of interest, outdoor features, and other explicit or implicit inputs. The user may control how the data is used in the evaluation of offered real estate. In some embodiments, the user may receive offered real estate and update the user supplied data to adjust the user supplied data to receive real estate offers that are compatible with the updated user supplied data.

In some embodiments, the systems and methods described herein may generally be referred to as a personal real estate system. In some embodiments, the personal real estate system may facilitate interaction with a seeking user for the collection of factors indicating compatibility, desires, expectations, and satisfaction information expressed in at least one customized real estate relationship profile. The relationships profile may be processed with additional information such as, for example, real estate related trends, and real estate related features. The additional information may improve the results of a real estate listings searches and offered for a real estate listing search that are tested for relevancy and desirability applied to the at least one customized seeking user's profile during an analysis process. The analysis may be performed for the final goal of facilitating the seeking user decision to pursue a new real estate transaction or to not pursue a new real estate transaction. The seeking user may be one or more individuals, or an informal or formal group, who desires to evaluate current or future real estate for best and highest use and associated transactions such as buying, leasing, using, or otherwise occupying real estate. The real estate may be any private, public, or commercial property.

In some embodiments, the personal real estate system facilitates private and specific interaction with a real estate offering user for the collection of factors indicating compatibility, desires, expectations, and satisfaction information expressed in one or more seeking users' profiles, processed with additional information, such as real estate related trends, and real estate related features. The data may be processed to improve the results of the seeking users' real estate listings search or offered to the seeking users for a real estate listing search that are tested for relevancy and desirability applied to the at least one customized profile during an analysis process. The analysis may be performed for the final goal of facilitating the offering user's decision to pursue a new real estate transaction, or to not pursue a new real estate transaction, or to add, modify, or delete information on the offered real estate transaction. The offering user may be one or more individuals, or an informal or formal group, who desires to offer real estate for best and highest use and associated transactions such as offering to buy, lease, use, or otherwise occupy real estate, or to provide services for offering to buy, lease, use, or otherwise occupy real estate.

In some embodiments, the personal real estate system facilitates evaluating the compatibility of the user's current ownership, lease, use or occupation of real estate with the user's goals for highest and best use of real estate. In this embodiment, the seeking user and offering user are the same entity, and the system may enable the user to evaluate whether the user's current ownership, lease, use or occupation of real estate is satisfactory or unsatisfactory, independent of other real estate offered for ownership, lease, use or occupation.

The subject matter of the embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, in some embodiments, network interface card (NIC) 124 is also optionally attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
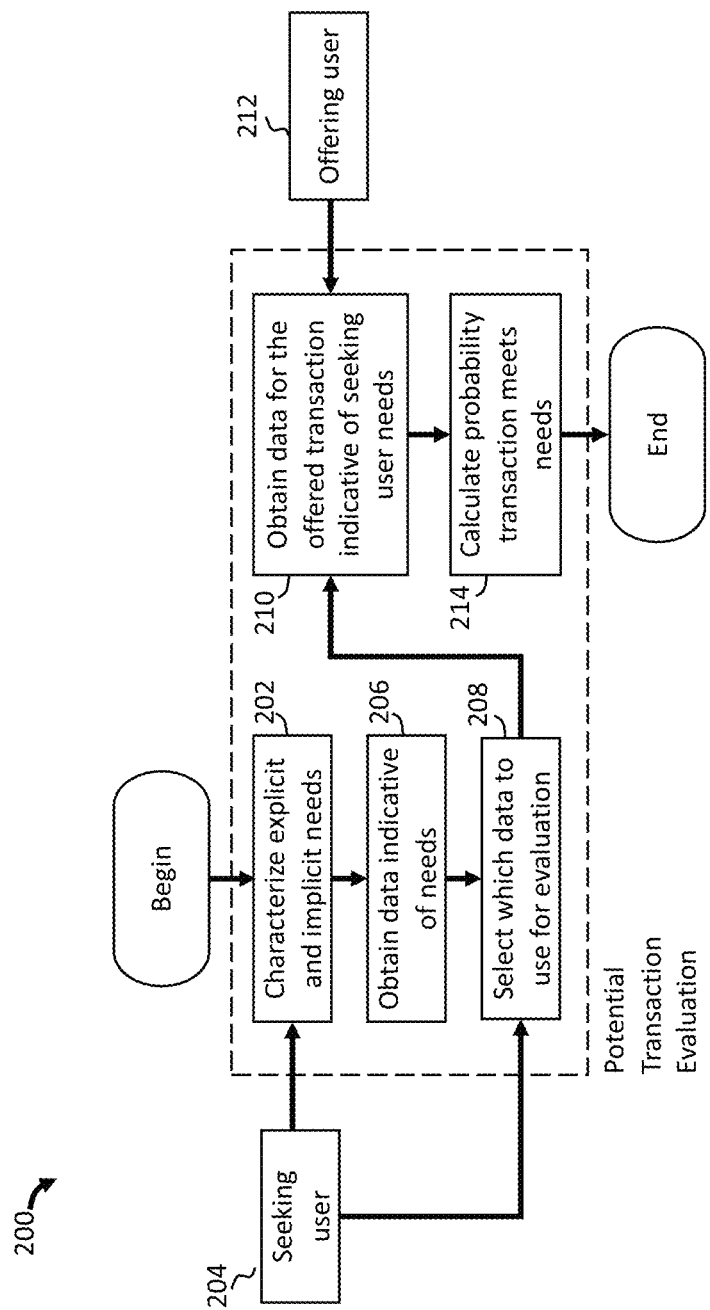
FIG. 2 depicts an exemplary process for evaluating a potential transaction between a seeking user and an offering user.

FIG. 2 depicts an exemplary process overview of determining a relative non-monetary value of a real estate transaction to seeking user 204 seeking a transaction with offering user 212 offering a transaction represented generally by the reference numeral 200. In some embodiments, seeking user 204 may prepare a custom profile including the user supplied data as described above. The custom profile may include explicit needs stated by seeking user 204. In some embodiments, the custom profile may include the user data comprising fundamental real estate objective, a real estate history, a location of current and desired community connections, a location of current and desired needs for amenities, desirable interior features of real estate property, desirable exterior features of real estate property, and acceptable and unacceptable material facts. Furthermore, the custom profile may include any information that may aid in selecting real estate to meet the highest and best use of the real estate for seeking user 204.

Figure 3:
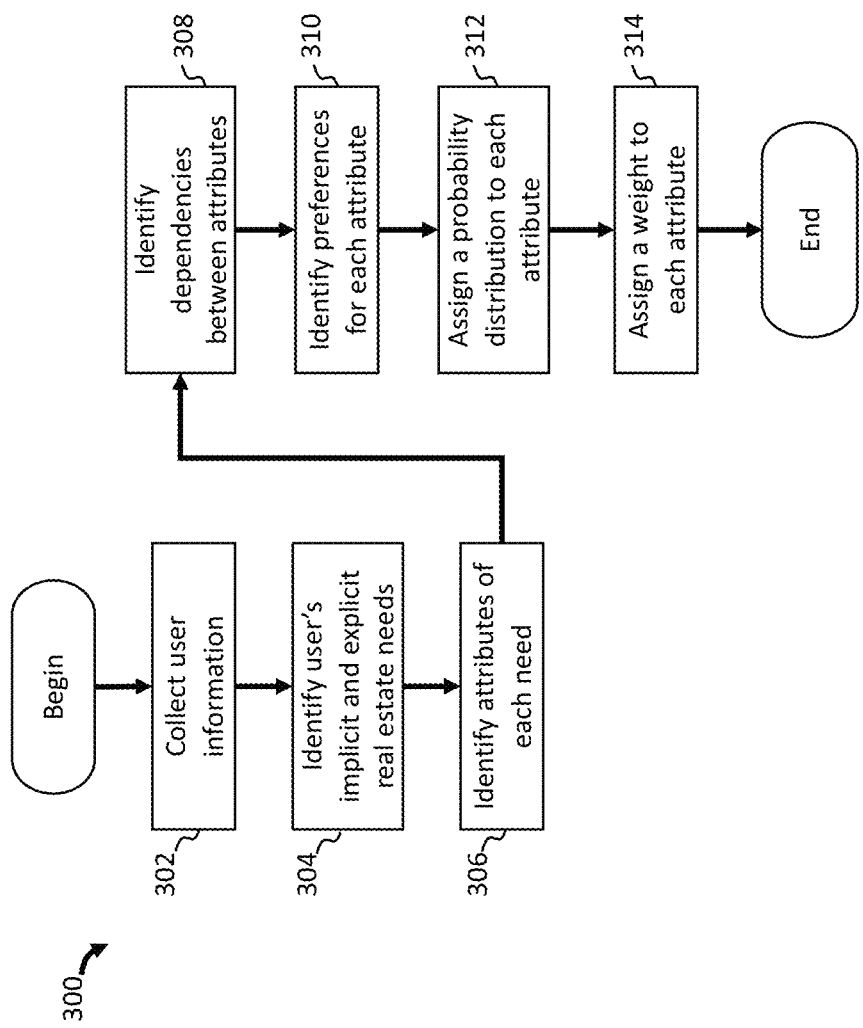
FIG. 3 depicts a characterization of real estate needs of a user seeking a real estate transaction.

At step 202, explicit needs and implicit needs for real estate use and benefit of the at least one seeking user 204 may be characterized from a plurality of data sources. A process for characterizing the needs of seeking user 204 is depicted in FIG. 3 and described in detail below. At step 206, data indicative of said needs of seeking user 204 may be obtained from a plurality of data sources. At step 208, seeking user 204 may add, delete, or select which data indicative of the explicit needs and the implicit needs to include in the characterization. At step 210, a plurality of real estate transactions may be offered to seeking user 204 based on the explicit needs and the implicit needs. At step 214, the relative non-monetary value of a real estate transaction may be calculated and expressed as the probability that the real estate transaction achieves the seeking user's highest and best real estate use or benefit, where the highest and best real estate use is an optimized value or values indicative of how well the real estate is associated with the user input data (e.g., the implicit needs and the explicit needs).

FIG. 3 depicts an exemplary process for characterizing the real estate needs of seeking user 204 seeking a real estate transaction represented generally by the reference numeral 300. Initially, at step 302, the user data is collected and stored in a user profile. The user data may be any information associate with a user profile such as, for example, identity information, tax information, credit information, demographic information, location information, and the like. Furthermore, the user profile may include any real estate needs, attributes, and any other information that may be used to determine the highest and best real estate for use by seeking user 204 as described herein. The user data may be used by the personal real estate system to compare and match available real estate with seeking user 204 to provide the best and highest use for the real estate and provide the highest satisfaction to seeking user 204.

At step 304, seeking user's real estate needs (i.e., explicit needs and implicit needs) may be identified from the user data collected from seeking user 204. Examples of an explicit need may be a 4-bedroom detached house, 2.5 bathrooms, a two-car garage, a location in a particular area, and any other information that may be explicitly needed and provided by seeking user 204. Examples of an implicit need may be a quiet private outdoor area, short and easy commute, sun exposure, mature landscaping, and any other need that may be implicitly evaluated for seeking user 204.

At step 306, attributes of each real estate need of seeking user 204 may be identified. In some embodiments, examples of an attribute may be heated square footage, number of bedrooms, land area, proximity to the airport, distance to nearest neighbor, distance to downtown, distance to shopping, and any other relevant attribute that may contribute to and be classified as one or more of proximity, quality of life, comfort, appeal, effective age, and other. Furthermore, attributes may be designated as primary attributes and secondary attributes based on importance to seeking user 204 and based on dependencies. In some embodiments, the dependent attributes may be categorized as secondary attributes.

At step 308, dependencies between attributes of the user's real estate needs may be identified. An example of an attribute dependency is the attribute "quiet" is dependent on a wide selection of other attributes either alone or in combination such as, for example, proximity to a multi-lane, high speed road, an airport flight path, or the existence of an installed privacy fence. Similarly, seeking user 204 may have a pet, such as a dog. Proximity to a veterinarian may be analyzed as well as proximity to the neighbors and a probability of a Homeowner's Association (HOA) may also be determined.

At step 310, explicit preferences and implicit preferences of seeking user 204 for each attribute may be identified. In some embodiments, an example of an explicit preference may be a requirement for a garage. An example of an implicit preference is for a garage that has a connecting door to the house on the ground floor. The connected door to the garage may be an example of the dependencies between attributes and the preferences built into those dependencies.

At step 312, at least one pass-fail criterion may be assigned to each attribute based on seeking user's implicit preferences and explicit preferences, and, in some embodiments, the criterion may be represented as a value or a probability distribution. In an exemplary embodiment, a pass-fail criterion represented as a value may be a preference that a home has a two-car garage. A home with a one car garage may fail this criterion whereas a home with a garage that accommodates two or more passes. This is a binary pass-fail criterion based on a binary yes or no evaluation. In some embodiments, the binary evaluation may apply to non-binary attributes. For example, a non-binary attribute may represent a size of the property. Seeking user 204 may prefer a lot of land that is between 0.5 and 1.0 acres. The lot of land may be evaluated such that anything 0.5 to 1.0 acres is classified as 1 ("yes") or 0 ("no"). Alternatively, the pass-fail criterion may be represented as a probability distribution. A property with land size between 0.5 and 1.0 would pass (get a score of 1 for this criterion), but a property with a land size just outside this range should not be discarded and instead get a slightly lower score for this criterion. Property that has a land size well outside of the preferred range gets a very low score or a score of zero for this criterion.

At step 314, a weight may be assigned to each attribute score, reflecting how much one attribute is preferred over another. For example, seeking user 204 may indicate which attributes are more desirable on a scale of 1-10, indicating least desirable to most desirable, or any other classification method. In some embodiments, weights may be applied automatically based on the user data, historical personal data of seeking user 204, on crowd sourced data of similar attributes, or any combination thereof. In some embodiments, seeking user 204 may update the user data at any time, and the weights may be updated indicative of the updated data.

The embodiment presented in FIG. 3 presents the collection of factors indicating compatibility, desires, expectations, and satisfaction information expressed in one or more user profiles, processed with additional information that may be received from seeking user 204 and included in the user data. Exemplary additional information may include the user's opinions about real estate related trends and any other real estate related features. The collection of factors may be used to improve the results of real estate listings searches, or offers to seeking user 204 for a real estate listing search that are tested for relevancy and desirability applied to the at least one customized user's profile during an analysis process for the final goal of facilitating a user's decision to pursue a new real estate transaction or to not pursue a new real estate transaction.

Figure 4:
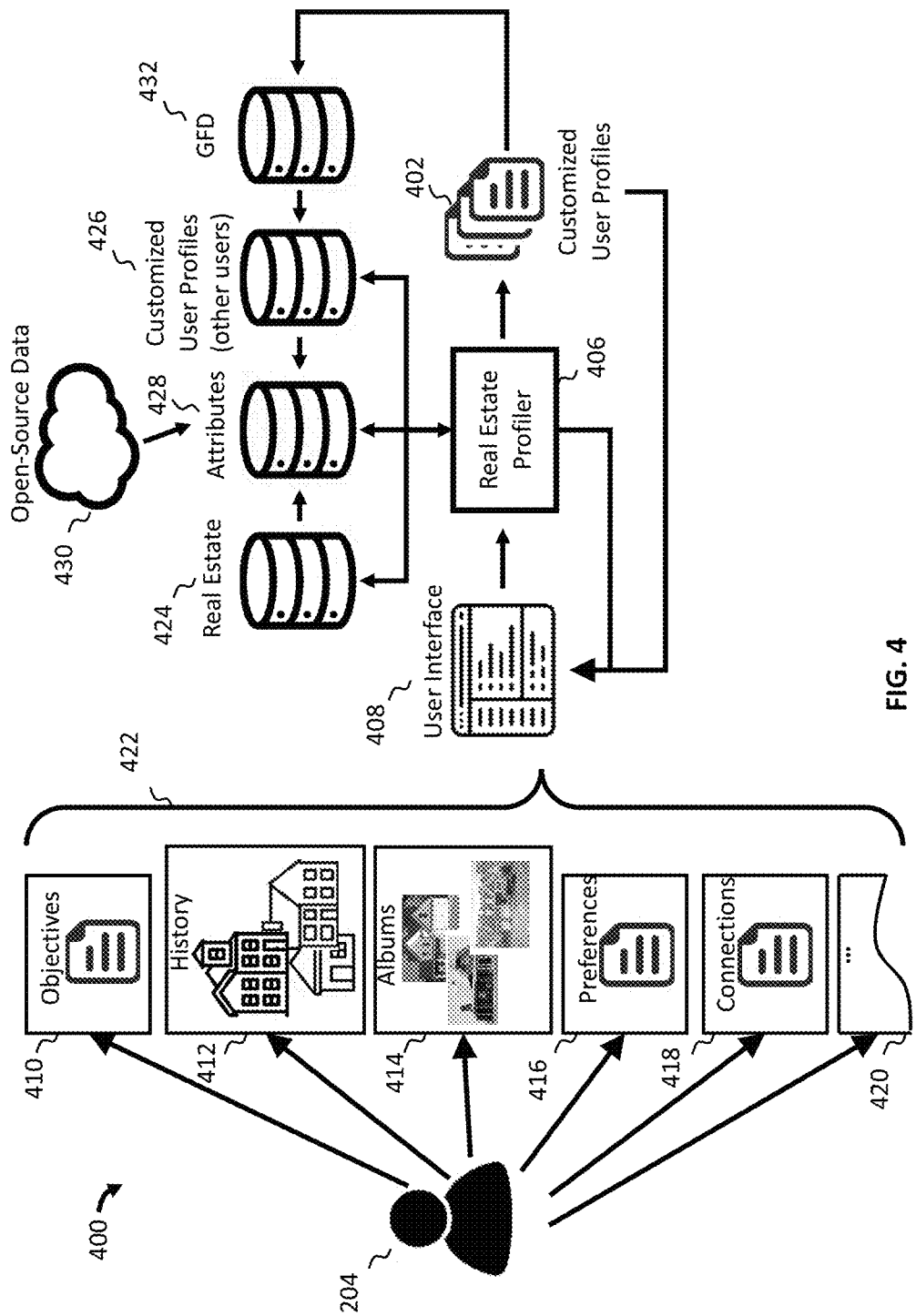
FIG. 4 depicts an exemplary process for establishing a user profile.

Turning now to FIG. 4, a schematic of an exemplary process of establishing customized user profiles 402 is depicted and referred to generally by reference numeral 400. In the example shown, real estate profiler 406 interacts with seeking user 204 through user interface 408 to collect relevant information that defines the real estate preferences of seeking user 204. In some embodiments, user data provided by seeking user 204 may include individual objectives 410, real estate history 412, albums 414, preferences 416, connections 418, and any other information 420 that seeking user 204 provides as user data and stored in customized user profiles 402. In some embodiments, the relevant information may be used to define the past, current, and desired real estate relationships of seeking user 204 that achieves best and highest real estate use for seeking user 204.

In some embodiments, individual objectives 410 may include, for example, a bigger house, more land, reduced commute time, lower housing expenses, maximized real estate appreciation potential, maximized potential return on real estate investment, and any other objective that achieves best and highest real estate use as defined by seeking user 204. Real estate history 412 may include addresses of past and current real estate owned, rented, visited, and lived in by seeking user 204. Albums 414 may include real estate exterior images and/or interior images of past and current real estate owned, rented, visited, and lived in by seeking user 204. Furthermore, albums 414 may include real estate exterior and interior images collected through any means by seeking user 204 such as, for example, web browsing, and that seeking user 204 identifies as appealing or unappealing. Preferences 416 may include specific attributes, such as location, real estate architecture, zoning, HOA restrictions, specific material facts, size, price, or cost to use, sewage system, and other real estate related attributes. Connections 418 may include workplace, family, friends, religious affiliations, sports affiliations, leisure activities, restaurants, stores, charitable organizations, and other personal connections visited or desire to visit by seeking user 204. The total collection of information 422 provided by seeking user 204 may be at least one piece of information in at least one category of individual objectives 410, real estate history

412, albums 414, preferences 416, connections 418, and any other information 420 that seeking user 204 is willing to provide. In some embodiments, real estate profiler 406 identifies and quantifies implied real estate relationships of seeking user 204 from the total collection of the information 422 provided by seeking user 204 by comparing the information contained in a real estate database 424 of past and current real estate, a database of customized user profiles such as database of other user profiles 426, and a database of real estate attributes 428. The database of real estate attributes 428 may be obtained from the real estate database 424 of past and current real estate, the database of other user profiles 426 of other users, and from open-source data 430 comprising any open-source data related to real estate. In some embodiments, information indicative of geographic locations is stored in geographic feature database (GFD) 432. The geographic location information may be used in determining real estate location and relative distance to landmarks and is discussed in more detail in reference to FIG. 7 and described below.

In some embodiments, rather than evaluating a plurality of real estate properties, seeking user 204 may input information indicative of a single property and the single property may be spontaneously evaluated based on the needs of seeking user 204. Furthermore, a GPS location of seeking user may be tracked and a real estate property may be evaluated based on a location of seeking user 204. For example, seeking user 204 may be driving through a neighborhood house-hunting, and come across a property that seeking user 204 wishes to evaluate. Seeking user 204, may open the application and, based on the location of seeking user 204 and the proximity of seeking user 204 to the listed property, the listed property may automatically be evaluated based on the needs of seeking user 204. As such, any reference to real estate property and any analysis of real estate property described herein may include one or more real estate properties and may be evaluated based on user input or on relative location of seeking user 204 to a property to be evaluated.

Figure 5:
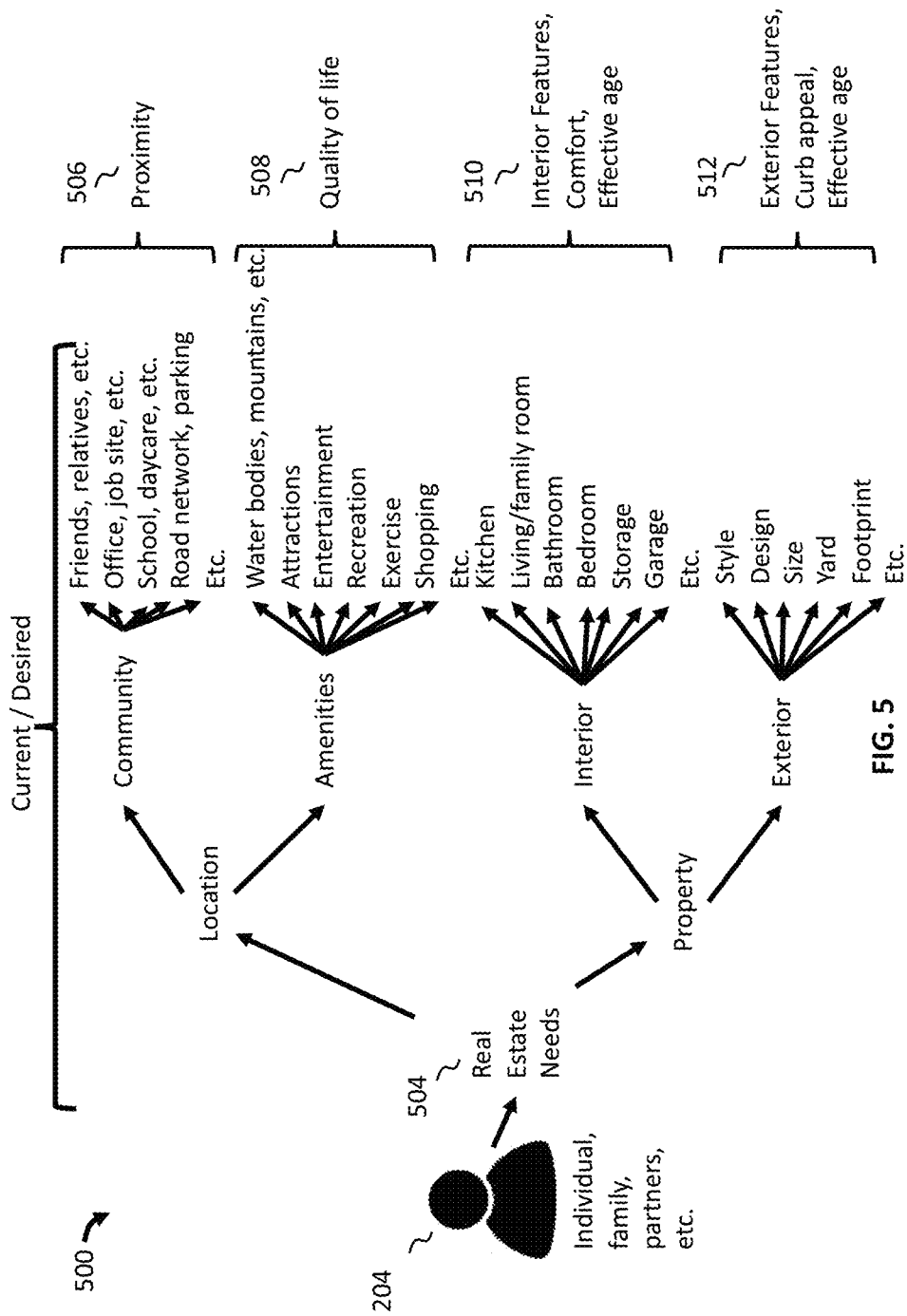
FIG. 5 depicts an embodiment of real estate relationships in a user profile.

Turning now to FIG. 5, a schematic of an exemplary real estate relationship profile of a user is depicted and referred to generally by reference numeral 500. In some embodiments, seeking user 204 may provide at least one piece of real estate related user data 504 that can be used to establish a real estate relationship based on determined intention of seeking user 204. Real estate related user data 504 may comprise explicit data such as, for example, a four-bedroom house, at least 2.5 bathrooms, a garage, and any other explicit data. Furthermore, real estate related user data 504 may comprise implicit data. For example, seeking user 204 may fill out a questionnaire or provide data in any manner as user data, and indicate "Exercise is very important to me" which may translate to implied data such as proximity to fitness health businesses, state, local or national parks, greenways, and other exercise-related attributes. Similarly, implied data may be obtained from images of specific items or situations that can be translated to discrete elements and reassembled for classification and categorization such as, for example, prioritizing curb appeal based on analysis of landscaping, front doors, and exterior home colors in pictures. The explicit data and implicit data may be categorized. The categories may help seeking user 204 and personal real estate system to prioritize the highest and best use components for a real estate selection, creating an opportunity for improved results. In some embodiments, the explicit data and the implicit data may be explicit needs and implicit needs of seeking user 204.

In some embodiments, past, current, and future real estate relationships can be described using data contained in the above-described categories. Positive and negative experiences can be captured by simple "like" or "dislike" submitted by seeking user 204. Furthermore, the implicit repeated selection of some attributes in the past and current real estate relationships as well as idealized relationships from image inclusions or other implicit online actions may be categorized. Continuous collection and analysis of a wide group of profiles, marketplace evaluations, sales trends, and other data sources can identify attributes that are more or less desirable in real estate relationships based on collected historical data and seeking user associated data. Data that is related through correlation and obtained through these methods may be assembled in categories, creating user-defined requirements (needs) and preferences. The categories can be pre-defined or user titled for meaningful identification (e.g., Proximity 506, Quality of Life 508, Interior Features 510, Exterior Features 512). One or more of the user categories may then be combined in a profile to emphasize user priorities, specific attributes, and implicit desires. The capability to keep a persistent profile or set of profiles may allow seeking user 204 to change aspects of their custom real estate relationship needs, keeping up with new trends, home features, life changes, and other significant factors that affect real estate highest and best use. In some embodiments, as interests and needs of seeking user 204 change, seeking user 204 may provide feedback that may change the overall attributes database, mapping the evolving user trends. The updated user data may introduce new attributes, diminish attributes that are losing value, and update the search results over time. Consequently, the personal real estate system may be updated with the most recent trends, needs, and preferences for seeking user 204.

Figure 6:
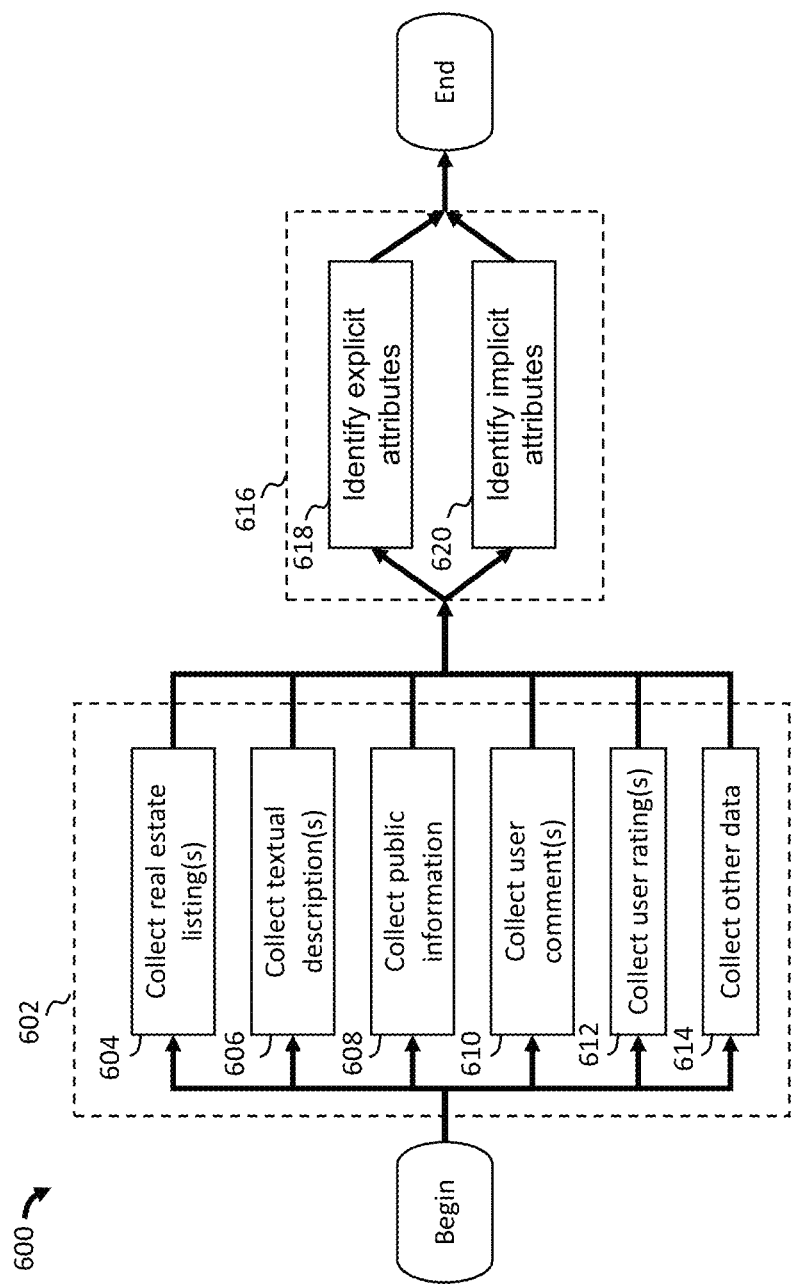
FIG. 6 depicts an exemplary process for identifying attributes based on description.

FIG. 6 depicts an exemplary process for identifying real estate attributes based on real estate descriptions represented generally by the reference numeral 600. Initially, at step 602, real estate attributes are received from a plurality of data sources such as, for example, real estate property listings 604, textual descriptions 606, public information 608, user comments 610, user ratings 612, and other description data 614 that describes real estate properties. For example, Multiple Listing Service (MLS) listings can provide a wide range of typical attributes such as the number of rooms including the types of rooms and number of bedrooms, age of the property, construction of the property, lot size, location, and any other property attribute. Pictures or images of real estate items such as, for example, a farmhouse sink, tile, and hardwood floors from listings, photographers, and any other data source can be processed for real estate attributes. Textual descriptions 606 are often included in a listing, and in a builder's marketing information, and can be gained from agents or people viewing the property and may be processed for attributes. Public information 608 like tax records, deed recordings, local municipality public announcements, and social media may provide information in text, schematics, pictures, and images that may be processed into real estate attributes such as lot dimensions, location, or associated neighborhood features. User comments 610 and user ratings 612 may provide information related to real estate attribute desirability or scarcity.

At step 616, the real estate attributes may be analyzed to identify explicit attributes 618 and to identify implicit attributes 620. Furthermore, geographic maps and images that show proximity of natural and man-made features and accurate traffic estimations can provide real estate attributes relative to a location. As described above, an exemplary explicit attribute may be the occurrence of having bedrooms with a value at least 1. An exemplary implicit attribute may be a quiet backyard. The quiet backyard may be an implicit attribute because it may be evaluated based on other attributes such as, for example, a property having a privacy fence, proximity to a low traffic and low speed road, and the absence of a nearby airport, thus avoiding flight path noise.

Figure 7:
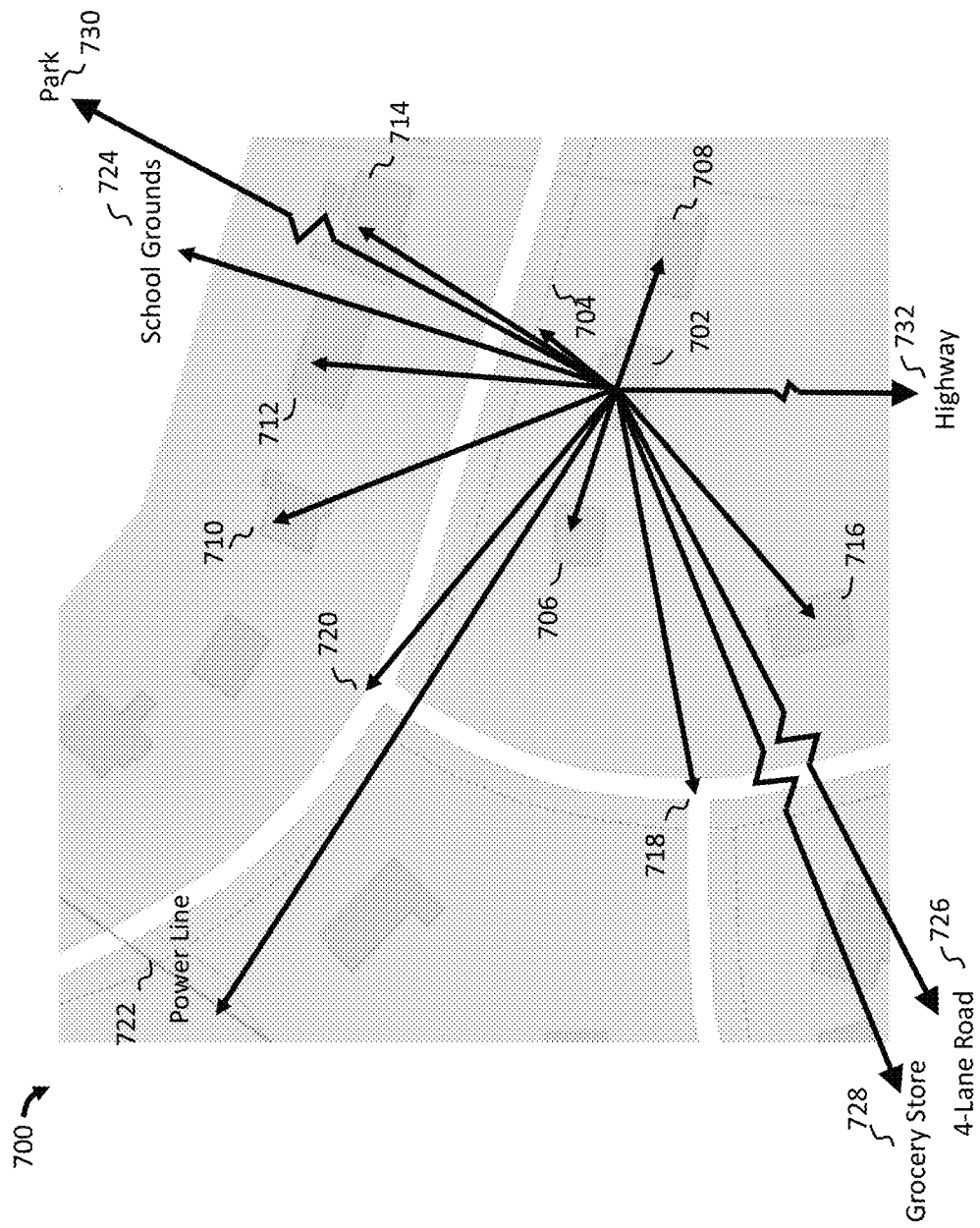
FIG. 7 depicts exemplary proximity attributes of a real estate property.

FIG. 7 depicts exemplary proximity attributes of a single real estate property in an exemplary environment 700. In exemplary environment 700 depicted in FIG. 7, real estate property 702 includes a sidewalk 704 in front, west neighboring real estate property 706, and east neighboring real estate property 708, first property 710, second property 712 and third property 714 across the street, and rear property 716. Real estate property 702 is located near first intersection 718 and second intersection 720 and is near a power line 722 and school grounds 724. Within the vicinity is a 4-lane road 726, a grocery store 728, a park 730, and a highway 732. In some embodiments, each proximity attribute is described by primary characteristics of static data such as footprint, height, type, age, and elevation difference with and distance to real estate property 702, and secondary characteristics of temporal data such as traffic volume, sun exposure, and flooding potential. In some embodiments, the proximity attributes of a real estate property 702 may be used by the personal real estate system to evaluate if real estate property 702 achieves a user's best and highest real estate use according to seeking user 204, taking into account seeking user's complex criteria for location, proximity to neighbors, avoidance of power line easement, proximity to a school, proximity to a park, highway and grocery access, and acceptable road noise, as well as meeting any other needs and preferences of seeking user 204.

In some embodiments, GFD 432 stores data that may be used to identify, score, and rank properties based on the needs of seeking user 204. In some embodiments, data may be obtained from a plurality of data sources such as, for example, listing data (e.g., Multiple Listing Service (MLS)), property records (e.g., parcel data, tax records), landmark data (e.g., shops, attractions, bus stops), line data (e.g., roads, railways, area boundaries), terrain data (e.g., Digital Elevation Maps (DEM), Light Detection and Ranging (LIDAR) data, National Oceanic and Atmospheric Association (NOAA) data), imagery (e.g., satellite imagery, machine learning data sets), and other geographic data sources such as Open Street Map, Google, ArcGIS, Bing, and the like. In some embodiments, the collected data may be processed and stored in tables as described in more detail below. GFD data may be split into 0.2 by 0.2-degree longitude and latitude cells and a file stored for each cell. The processing and storage of data may provide quick and easy access such that the data may be obtained and analyzed offline and, in some embodiments, seeking user 204 may receive updated real estate information in about 0.3 seconds at scale. In some embodiments, high volumes of queries, up to hundreds of thousands, may be performed, and results may be delivered in about 0.3 seconds.

Further, as stated above, it may be important to have accurate geographic information. The stored data on GFD 432 may be processed to correct for incorrect or incomplete addresses from, for example, incorrectly entered addresses, missing house numbers, incorrect zip code, misspellings, and the like. Furthermore, the data stored in GFD 432 may be adjusted data that is adjusted for incorrect or incomplete geospatial coordinates located at a driveway entrance or center of a region rather than the center of a house. To reduce the noise in incorrect location information a plurality of geographic location data sources may be used, and the plurality of obtained locations may be combined and a median location and standard deviations determined. Furthermore, the error between the plurality of locations may be minimized using statistical and machine learning algorithms. In some embodiments, only data that is the most current among the above-mentioned data sources may be used.

An exemplary implicit need determination is now described in reference to FIG. 7. A user may fill out a questionnaire to obtain information related to implicit needs of an exemplary lifestyle category. For example, seeking user 204 may indicate via the questionnaire that seeking user 204 enjoys outdoor activities and does not like noise. The answers to the questionnaire may be mapped to lifestyle categories and stored in a lifestyle table in GFD 432 creating a relationship between data elements in the lifestyle table. Lifestyle metrics may be calculated as described below and stored in a second table, a metrics table. To reduce the table data analyzed, only lifestyle elements indicated via the questionnaire may be analyzed. Furthermore, if conflicting lifestyle elements exist, the data may be ignored.

In some embodiments, to score implicit needs, proximity of locations of lifestyle elements to real estate property may be determined and stored in the metrics table. For example, the distance between real estate property 702 and park 730 may be determined. Furthermore, a number of parks, or any other lifestyle element, within a half mile, one mile, and five miles, may be determined and stored. Furthermore, a distance between real estate property 702 and highway 732, downtown, airports, railroad tracks, and the like may be determined to score noise. Needs may be scored based on number within an area and distance to the stated implicit elements. In some embodiments, only real estate properties with implicit scores above a predetermined threshold may be presented to seeking user 204. In some embodiments, all scores for each lifestyle element are combined and weighted. The weights may initially be the same or different based on the user data. In some embodiments, seeking user 204 may submit evaluation of the results and the personal real estate system may provide updated results and weights for each attribute based on feedback of seeking user 204. In some embodiments, the results are automatically updated each time a user logs into the personal real estate system, when a user provides new user data, and periodically when the collection of new real estate changes.

Figure 8:
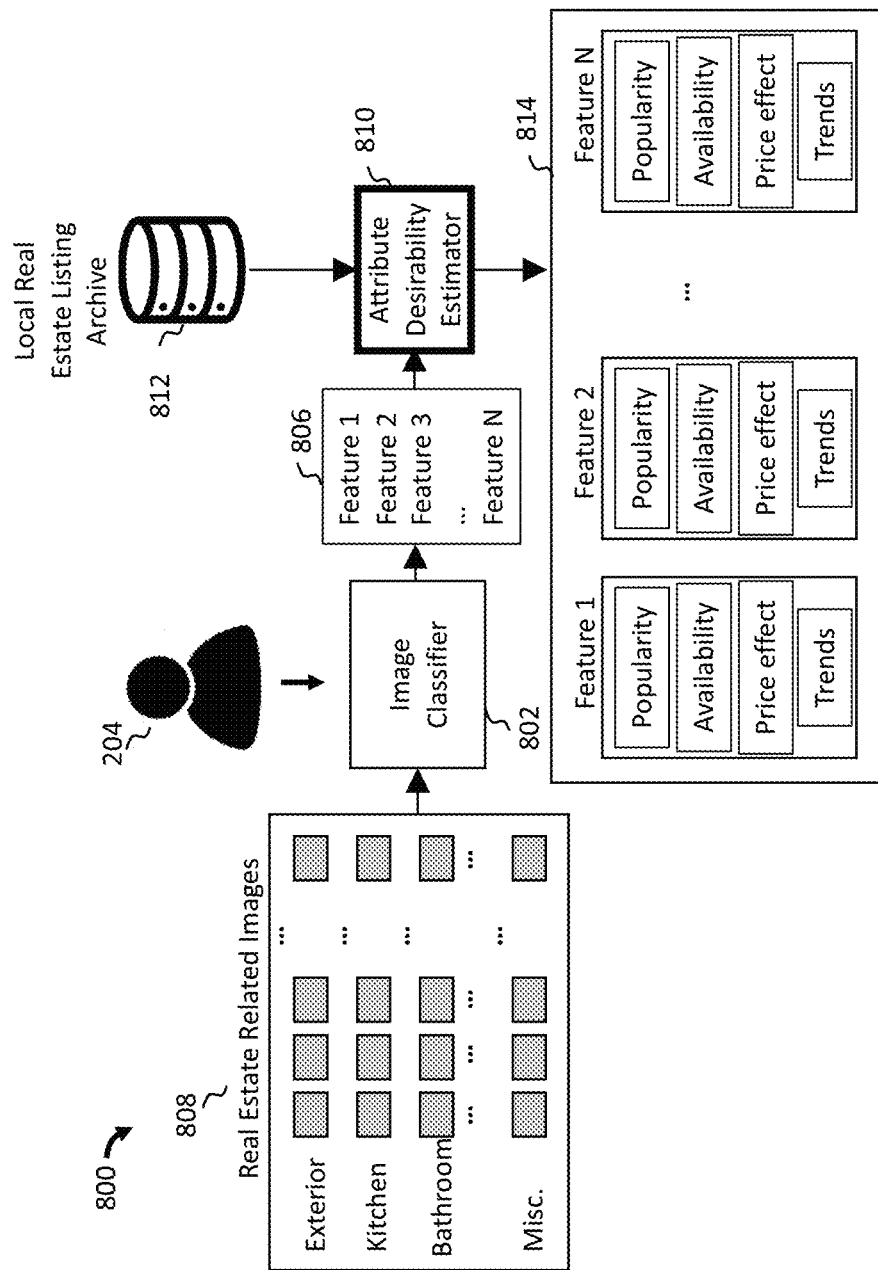
FIG. 8 depicts an exemplary process for identifying and classifying desirable and undesirable real estate attributes from images.

FIG. 8 depicts an exemplary process of identifying and classifying desirable and undesirable real estate attributes from images generally referenced by numeral 800. In some embodiment, image classifier 802 receives input from seeking user 204 identifying examples of desirable and undesirable real estate attributes 806 in real estate related images 808 provided by or selected by seeking user 204 in the process of establishing customized user profiles 402 described above. In some embodiment, real estate attributes 806 may be extrapolated from sources such as images of the exterior of properties such as, for example, front, sides, and rear of homes, decks, driveways, front entrances, and yards. In some embodiments, real estate attributes 806 may be extrapolated from interior features such as kitchens, built-in appliances, bathrooms, bathroom fixtures, bedrooms, ceiling heights, light fixtures, windows, doors, wall coverings, and floor coverings, and any other real estate related feature that are contained in pictures that may be selected by or provided by any user or included online.

In some embodiments, attribute desirability estimator 810 may explore the local real estate listing archive 812 to estimate factors 814 such as popularity, availability, price effect, and trends that influence the highest and best use value of seeking user 204. In some embodiment, real estate listing archive 812 includes current and past real estate listings with current and past real estate listing images as well as relevant factors such as, for example, initial asking price, days on market, sold pricing information, and any other information that can be used to characterize the impact of individual real estate features 806. In some embodiments, real estate listing images are analyzed for discrete attributes of interest to the population of users, assigned desirability factors, and further grouped for statistical use in determining the impact of individual real estate attributes on real estate value due to demand, price effect, and availability.

In some embodiments of the processes of identifying and classifying desirable and undesirable real estate attributes from images, image classifier 802 may be a Convolutional Neural Network (CNN) or other Machine Learning (ML) implementation that is trained on exemplary images to recognize and classify real estate attributes without the assistance of seeking user 204. Desirability and undesirability of real estate attributes from images can be established in a variety of ways with or without the assistance of seeking user 204.

Figure 9:
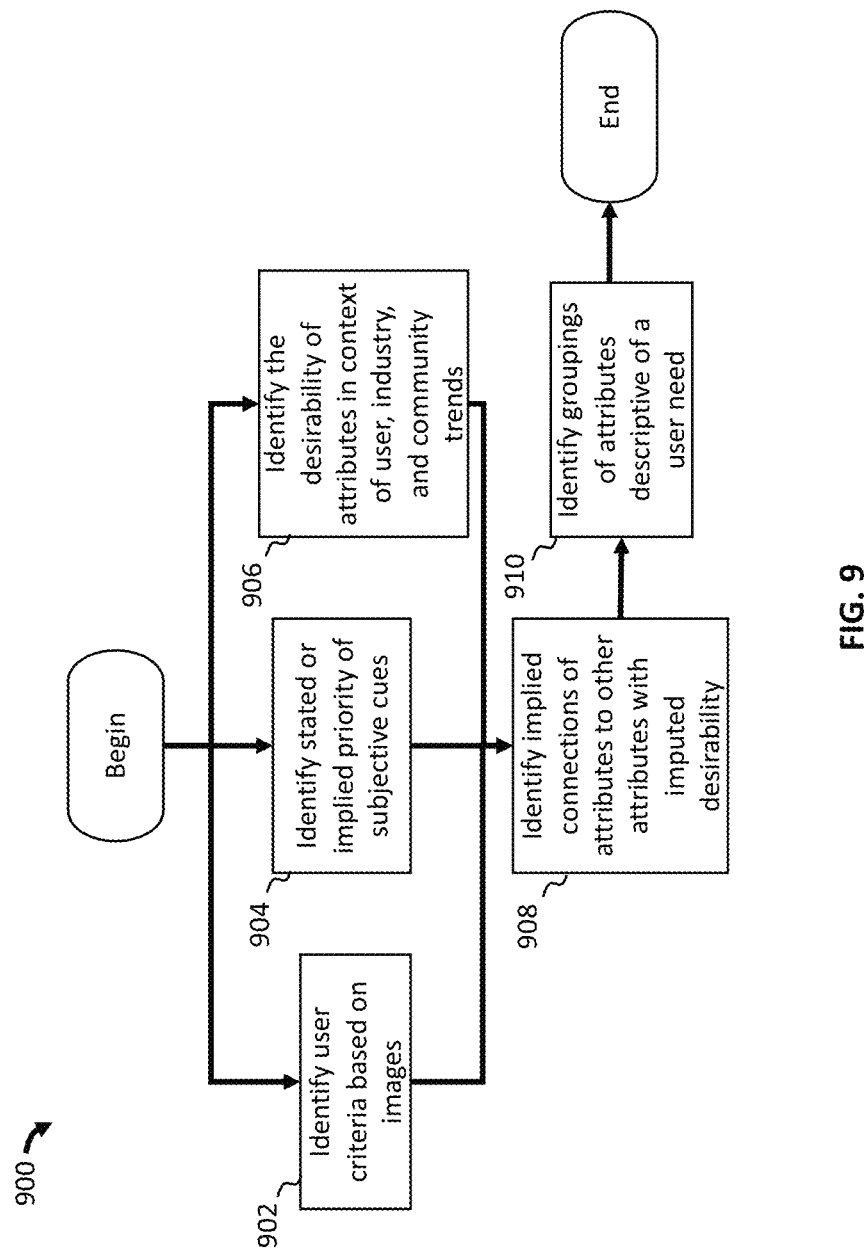
FIG. 9 depicts an exemplary process of establishing user preferences weights.

FIG. 9 depicts an exemplary process for determining attribute preferences of seeking user 204 seeking a real estate transaction represented generally by the reference numeral 900. At step 902, user criteria are identified based on images. For example, a user can provide a picture of a vintage two story farmhouse style home with a sweeping flat lawn and a driveway. If a user supplies multiple images for which some features are similar then the similarities can be used to infer which features (i.e., attributes) the user finds desirable.

At step 904, the stated priority of specific attributes or implied priority of attributes of subjective cues may be identified. A stated priority may be a priority that seeking user has specifically indicated. For example, seeking user 204 may have indicated an attribute that a house has 4 bedrooms is more important to seeking user 204 than an attribute that the house has two stories. Additionally, in some embodiments, the priorities may be implicitly extracted from the user submitted data.

At step 906, the desirability of specific attributes with respect to information provided by seeking user 204 in regard to context of user, industry, and community trends may be identified. For example, a comparison of the preferences of seeking user 204 to the preferences of other others may identify users with similar preferences. The comparison may also identify that the other users also indicated that farmhouse style sinks are a desirable attribute. In that case, the attribute of a house having a farmhouse style sink has an implied priority over another attribute that the other users deemed a lower priority, such as, for example, stainless appliances.

At step 908, implied connections of attributes to other attributes with imputed desirability may be identified. For example, a multi-lane road with a speed limit of over 55 miles an hour and high capacity may be regarded as undesirable for residential users because of imputed characteristics of noise, airborne dirt and dust, and unsightly views. A commercial user may regard the same road as having the desirable characteristics of convenient transport, speed for delivery, and a road network sufficient to accommodate large vehicles. At step 910, attributes may be mapped to groupings descriptive of desirability of seeking user 204 or the commercial user. Continuing with the previous example of a multi-lane road, the explicit grouping description "quiet outdoor living" may encompass the attributes of proximity of a multi-lane road and/or a planned expansion to an existing road, traffic speed, traffic density, privacy fencing or screening, distance of the dwelling to the road, distance between other dwellings, and proximity to commercial or public buildings.

Figure 10:
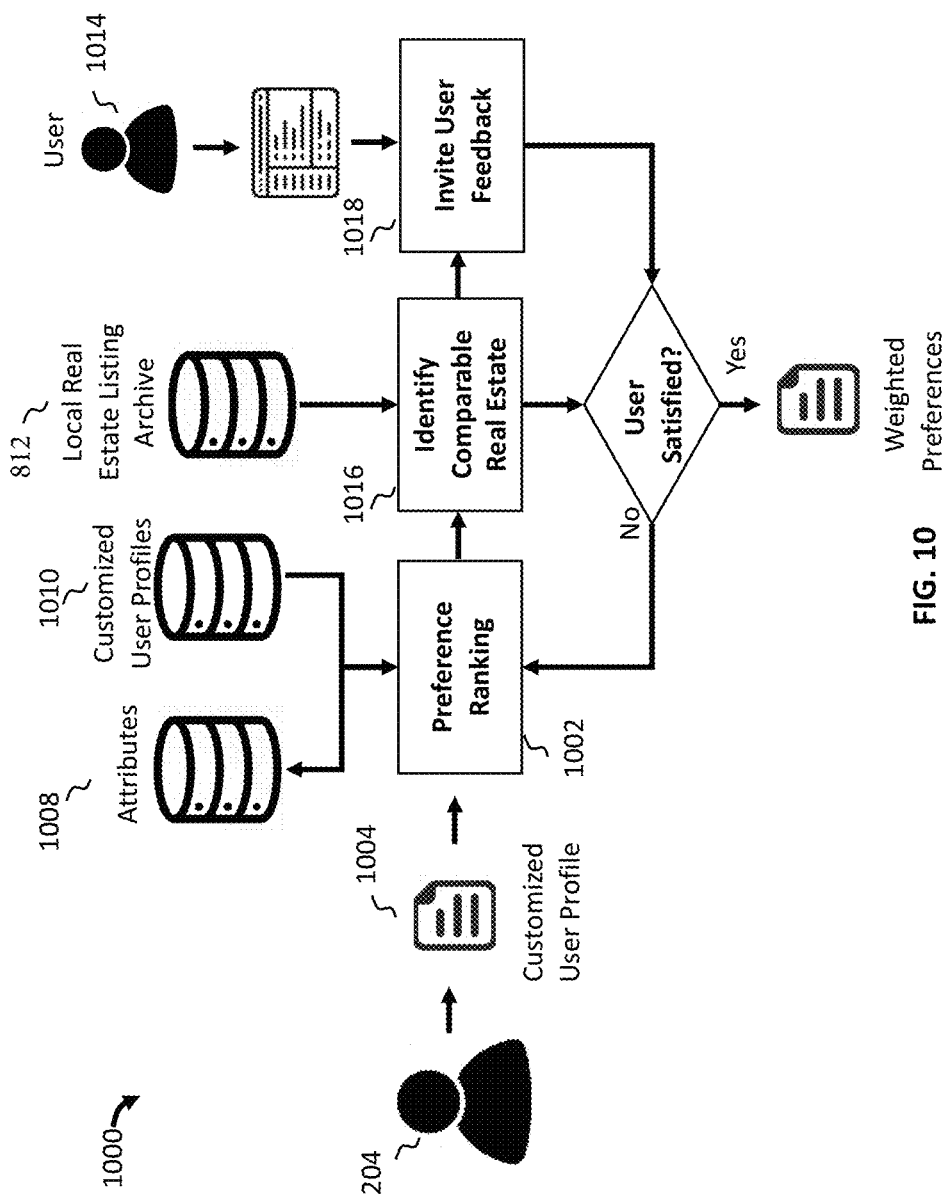
FIG. 10 depicts an exemplary process of establishing, refining and updating weights.

FIG. 10 depicts an exemplary process of establishing, refining, and updating weights assigned to real estate relationships in customized user profile 1004, generally referenced by the numeral 1000. In some embodiments, preference ranking engine 1002 maps the real estate relationships stored in the customized user profile 1004 of seeking user 204 to attributes in database 1008 and calculates normalized weights of the attributes based on preferences stored in a customized user profile 1004 of seeking user 204. In some embodiments, customized user profile 1004 is the same as seeking user 204 customized user profiles 402 described in embodiments above. In the event that seeking user 204 did not indicate preferences or that seeking user 204 provided insufficient or conflicting information to establish or calculate normalized weights, the customized user profile 1004 may be augmented by augmenting preferences of seeking user 204 using reasoning processes. For example, evidence-based reasoning may be utilized to identify and include preferences of other users that provided similar inputs stored in a database of customized user profiles 1010 and identifying a subset of similar mapped attributes and rank ordering to the mapped attributes based on relative weights of the subset of similar attributes. In the event that customized user profile 1004 or the database of customized user profiles 1010 contains insufficient data to establish a complete and consistent weighted rank ordering, the automated preference ranking engine 1002 may use a discriminating power score of mapped attributes to establish an initial estimate of the rank ordering. The discriminating power score may be used to include and order attributes for inclusion as supporting criteria for the customized user profile for seeking user 204. In this manner, each attribute of the supporting criteria has an associated weight derived from discriminating power of particular factors, such as, for example, user selection frequency, listing inclusion frequency, perceived value, as well as one or more classes, such as, for example, quality of life, effective age, and proximity.

In some embodiments, customer profile augmentation includes weighted attributes that reflect implied customer interests and their contribution to the real estate evaluation score. In some embodiments, other user 1014 may be asked to review the results and a reasoning process, such as, for example, evidence-based reasoning, is used to identify factors for meeting the best and highest use of the property for seeking user 204. The review results may be analyzed for specific attributes that can be added to customize the user profile of seeking user 204 and add new attributes to attribute database 1008 that were not already recognized or included in data provided by others. The review results may be organized using a subset of factors minimizing the feedback information requested from seeking user 204 such that the feedback information provides maximum discriminating power to update preference weights. The smaller subset of highly impactful attributes may ensure that the additional weight will be more influential in subsequent searches.

In some embodiments, the weight evaluation process uses the preference weights to identify real estate 1016 and receive feedback from seeking user 204 and/or other user 1014. In some embodiments, seeking user 204 may be the same as other user 1014. In other embodiments, other user 1014 may be one or more non-professional individuals, or an informal or formal group of non-professional individuals, or a professional, such as a real estate broker, real estate appraiser, mortgage broker, home repair technician, or a business employing such professionals, or any other individual or business providing services to assist seeking user 204 in arriving at weighted preferences that achieve best and highest real estate use for seeking user 204. The personal real estate system may compare the weighted attributes to available real estate and determine highest and best use for seeking user 204. Seeking user 204 and/or other user 1014 may provide feedback and the cycle continues. The cycle of automated preference ranking, identification of comparable real estate 1016, and user feedback 1018, may continue until seeking user 204 signals satisfaction, indicates a desire to conclude the evidence-based review process, or when the uncertainty ranges for the customized profile elements reach acceptable bounds.

Figure 11:
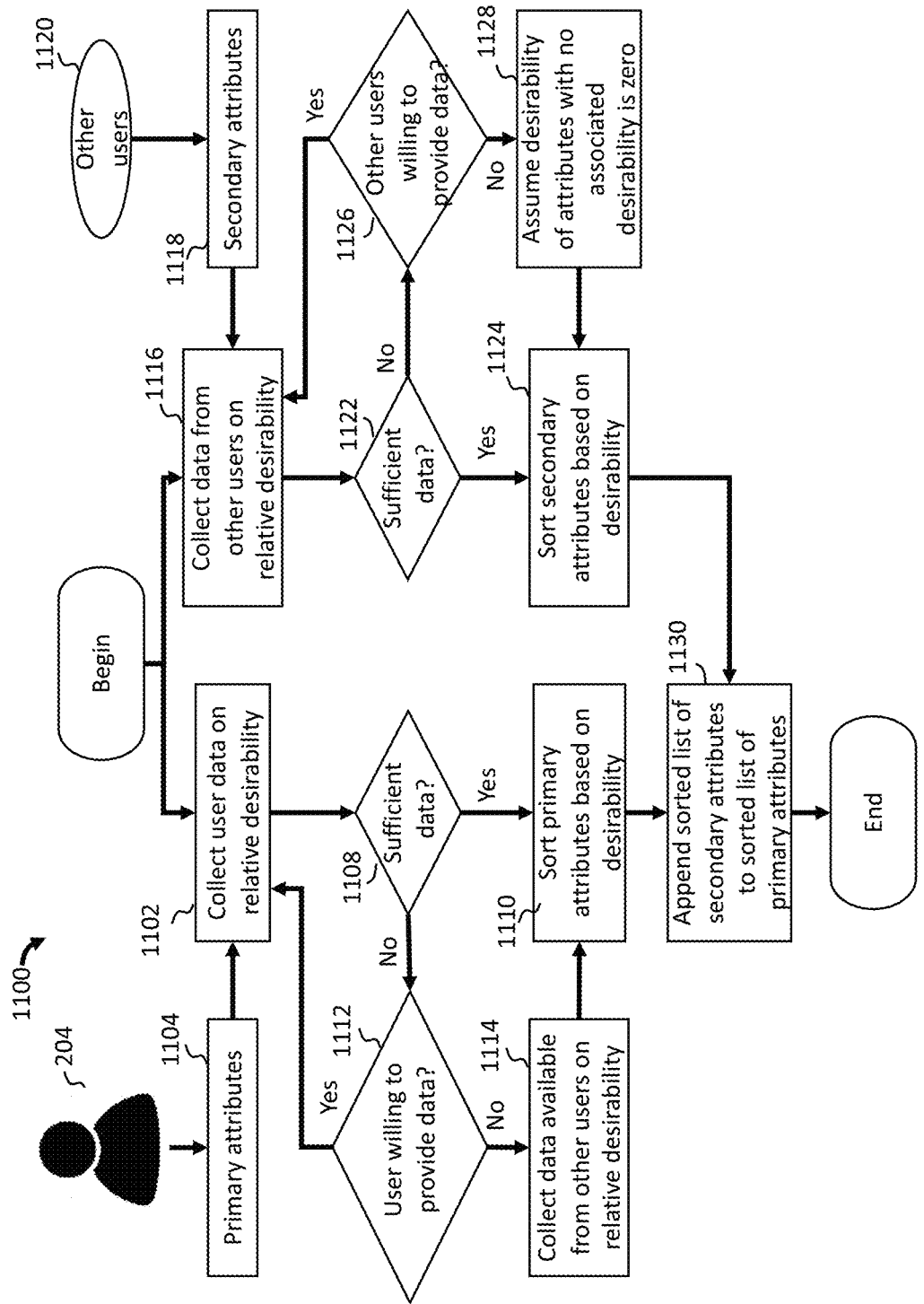
FIG. 11 depicts an exemplary process for ranking user preferences.

FIG. 11 depicts an exemplary process for ranking user preferences represented generally by the reference numeral 1100. At step 1102, user data may be collected on primary attributes 1104 associated with seeking user 204. At step 1108, it may be determined whether sufficient data is available to sort primary attributes based on desirability. At step 1108, if it is determined that sufficient data is available then the process moves to step 1110 where primary attributes are sorted according to relative desirability stated by seeking user 204. If, at step 1108, it is determined that insufficient data is available, at step 1112, a request to provide additional data is provided to seeking user 204. If seeking user 204 provides additional data, then the process proceeds with step 1102. If seeking user 204 is unwilling to provide more data, then the process may proceed with step 1114 to collect data on relative desirability of primary attributes 1104 available from other users. In the event that no desirability data is available for a primary attribute, the primary attributes 1104 may be assigned negligible desirability.

Furthermore, data may be collected from other users 1120 to complete attribute ranking. In some embodiments, at step 1116, user data may be collected on secondary attributes 1118 associated with other users 1120. It may be valuable to display to seeking user 204 attributes that are desirable to other users as seeking user 204 may not be aware or may forget to mention particular attributes. Seeking user 204 may indicate that they like, dislike, or are indifferent when presented with secondary attributes 1118. The user data may be updated with the response from the seeking user 204 to better match real estate to the attributes of seeking user 204. At step 1122, it may be determined whether sufficient data is available to sort secondary attributes based on desirability. If it is determined, at step 1122, that sufficient data is available, then, at step 1124, secondary attributes 1118 may be sorted according to the stated relative desirability of other users 1120. If, at step 1122, it is determined that insufficient data is available, at step 1126, a request may be provided to other users 1120 to determine whether other users 1120 are willing to provide more data. If other users 1120 are willing to provide more data, then the process may proceed to step 1116. If other users 1120 are unwilling to provide more data, the process may proceed to step 1128 where a negligible desirability may be assigned a to secondary attributes for which no desirability data is available from other users 1120. At step 1130, the sorted list of secondary attributes may be appended to the list of primary attributes so that primary attributes are ranked higher than secondary attributes based on the input received from seeking user 204 and other users 1120.

Figure 12:
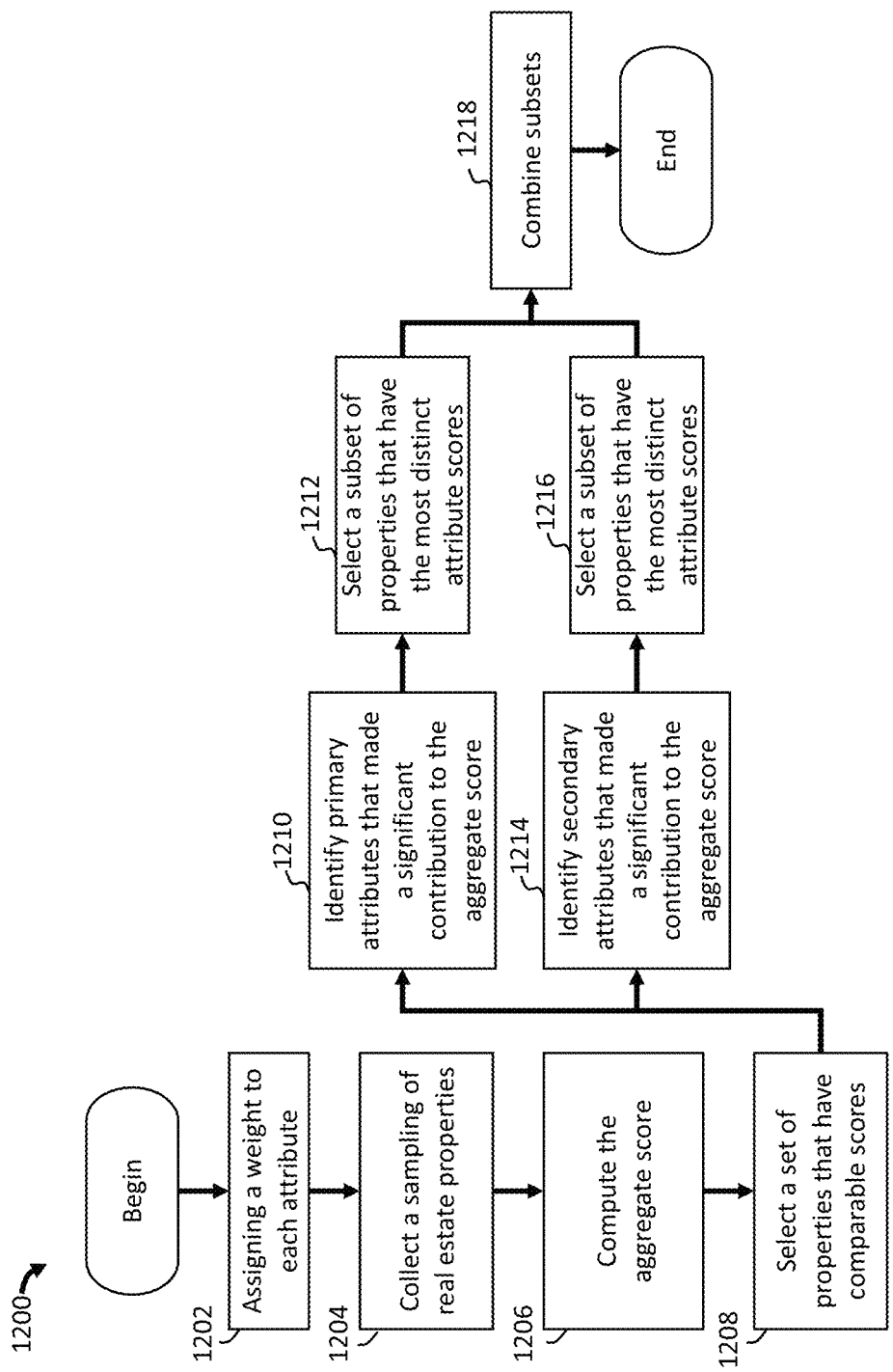
FIG. 12 depicts an exemplary process for identifying a set of comparable real estate properties.

FIG. 12 depicts an exemplary process for identifying a set of comparable real estate properties represented generally by the reference numeral 1200. Initially, at step 1202, a weight may be assigned to each attribute in the collection of primary and secondary attributes based on the relative desirability of each attribute as described above. At step 1204, a sampling of real estate properties may be selected from public and private databases as described above. At step 1206, the aggregate score for each real estate property selected at step 1204 may be computed using the process depicted in FIG. 15 and described in detail below. At step 1208 a set of real estate properties may be selected that have comparable scores to the scores determined at step 1206. At step 1210, primary attributes may be identified in the set of properties selected in step 1208 where multiple properties in the set have primary attributes in common and the primary attributes make a significant contribution in the aggregate score of at least one property in the set. At step 1212, a subset of properties may be selected that have primary attributes in common and that have the most distinct aggregate score contribution in the set. At step 1214, secondary attributes may be identified in the set of properties selected in step 1208 that multiple properties in the set have secondary attributes in common and the secondary attributes make a significant contribution in the aggregate score of at least one property in the set. At step 1216, a subset of properties may be selected that have secondary attributes in common and that have the most distinct aggregate score contribution in the set. At step 1218, the property subsets selected in steps 1212 and 1216 may be combined so that the reduced set contains properties that have attributes with maximum discriminating power.

Figure 13:
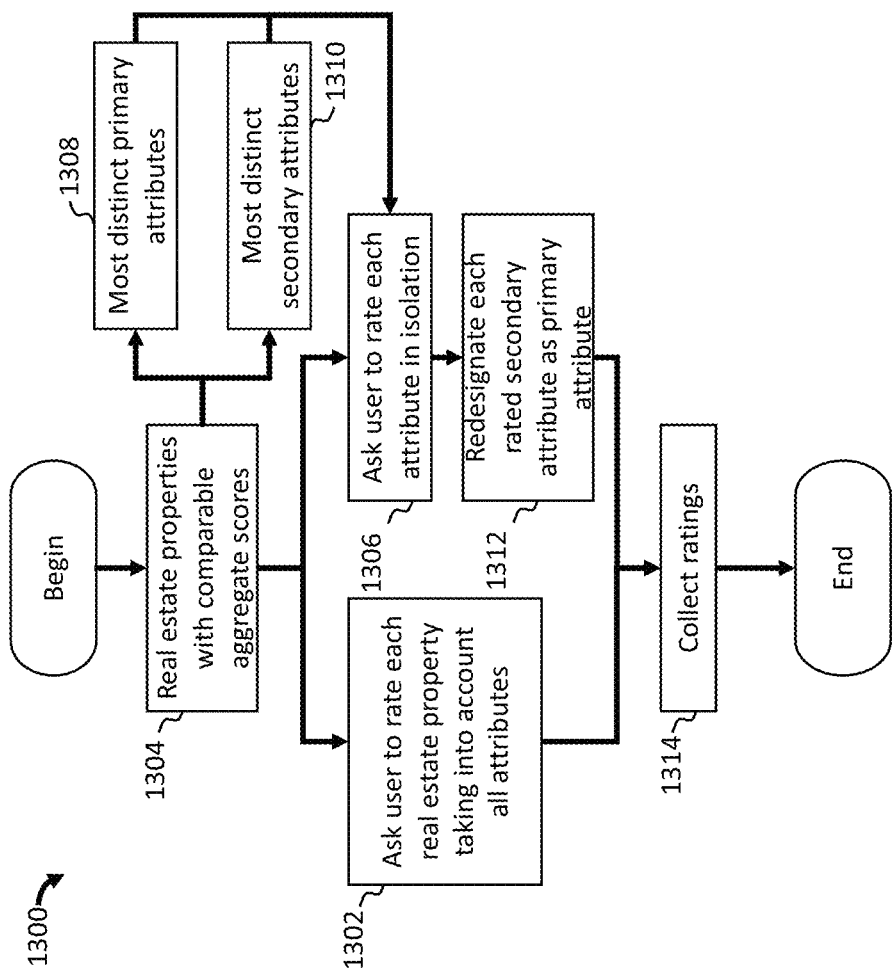
FIG. 13 depicts an exemplary process of user review of comparable real estate properties.

FIG. 13 depicts an exemplary process for inviting a user to review a set of comparable real estate properties that were determined in the process depicted in FIG. 12 above and generally referenced by numeral 1300. At step 1302, a request may be presented to seeking user 204 to rate each property in the set of properties with comparable aggregate scores 1304 that were determined by the process in FIG. 12. Seeking user 204 may rate each property taking into account all attributes of each property. At step 1306, a request may be presented to seeking user 204 to rate each most distinct primary attribute in the subset of attributes in common that have maximum discriminating power. At step 1308, seeking user 204 may then rate said primary attributes in isolation, and, at step 1310, seeking user may rate secondary attributes in isolation. At step 1312, rated secondary attributes may be redesignated as primary attributes. At step 1314, the aforementioned ratings may be collected and made available to the method depicted in FIG. 10 as generally described above.

Figure 14:
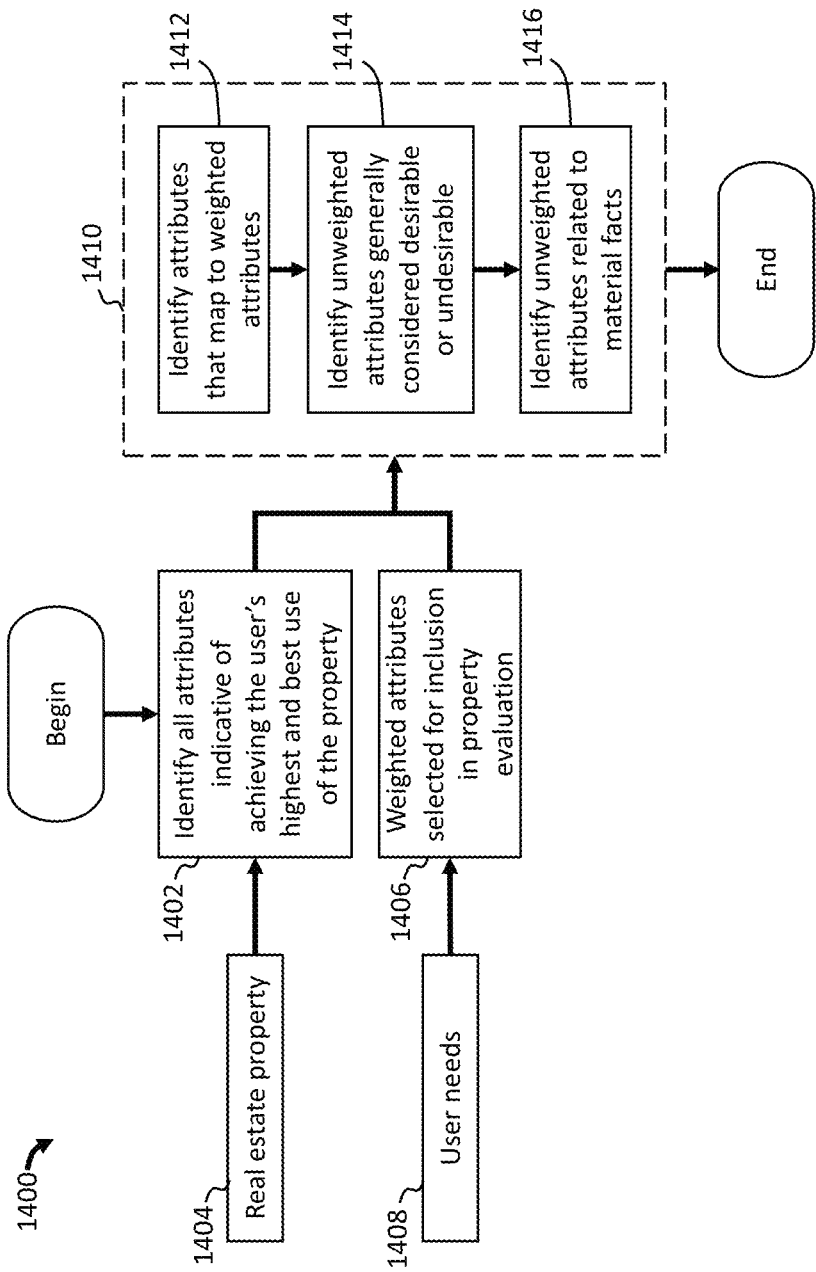
FIG. 14 depicts an exemplary process for obtaining real estate data for a real estate property.

FIG. 14 depicts an exemplary process for obtaining data indicative of the real estate property to meet the needs of a user represented generally by the reference numeral 1400. At step 1402, all attributes of real estate property 1404 from a plurality of data sources are identified. For example, real estate listing services may provide historical information entered by real estate professionals indicative of real estate property which, in some embodiments, may be a home. The historical information may comprise a year built, a size, a number of rooms, and a type of rooms of the home. Public records such as tax records and deed recordings can provide information about the property. Public information may be received and may comprise geographic location with respect to roads, homes, businesses, parks, and public services such as water treatment plants. In some embodiments, user provided pictures can be used to extrapolate attributes, and user supplied information can provide attribute information.

At step 1406, weighted attributes are selected that are indicative of user's needs 1408. User's needs 1408 may be the explicit needs and implicit needs of seeking user 204 as described in embodiments above. At step 1410, the attributes identified in step 1412, step 1414, and step 1416 may be retained for evaluating real estate property 1404 based on user's needs 1408. At step 1412, attributes of real estate property 1404 that map to user's needs 1408 may be identified. At step 1414, attributes may be identified that, from historic data, open-source data, or data indicative of other users, are generally considered desirable or undesirable and that do not map to any attribute characterizing the user's explicit needs and implicit needs for real estate use or benefit. For example, schools within a determined proximity may be desirable based on having children that may attend the school or may be an undesirable attribute if the seeking user 204 does not have children, works at home, and desires a quiet neighborhood during the day. At step 1416, attributes may be identified that are material facts of a real estate property and that do not map to attributes associated with user's needs 1408. Herein, a material fact is any item associated with real estate property 1404 that may change the mind of seeking user 204 about buying real estate property 1404. For example, seeking user 204 may not address public service or public use sites such as, for example, a landfill; however, a nearby landfill may influence a decision of seeking user 204. Attributes that map to material facts may be included for the user's rating of desirability and may be presented to seeking user 204 for personal evaluation.

Figure 15:
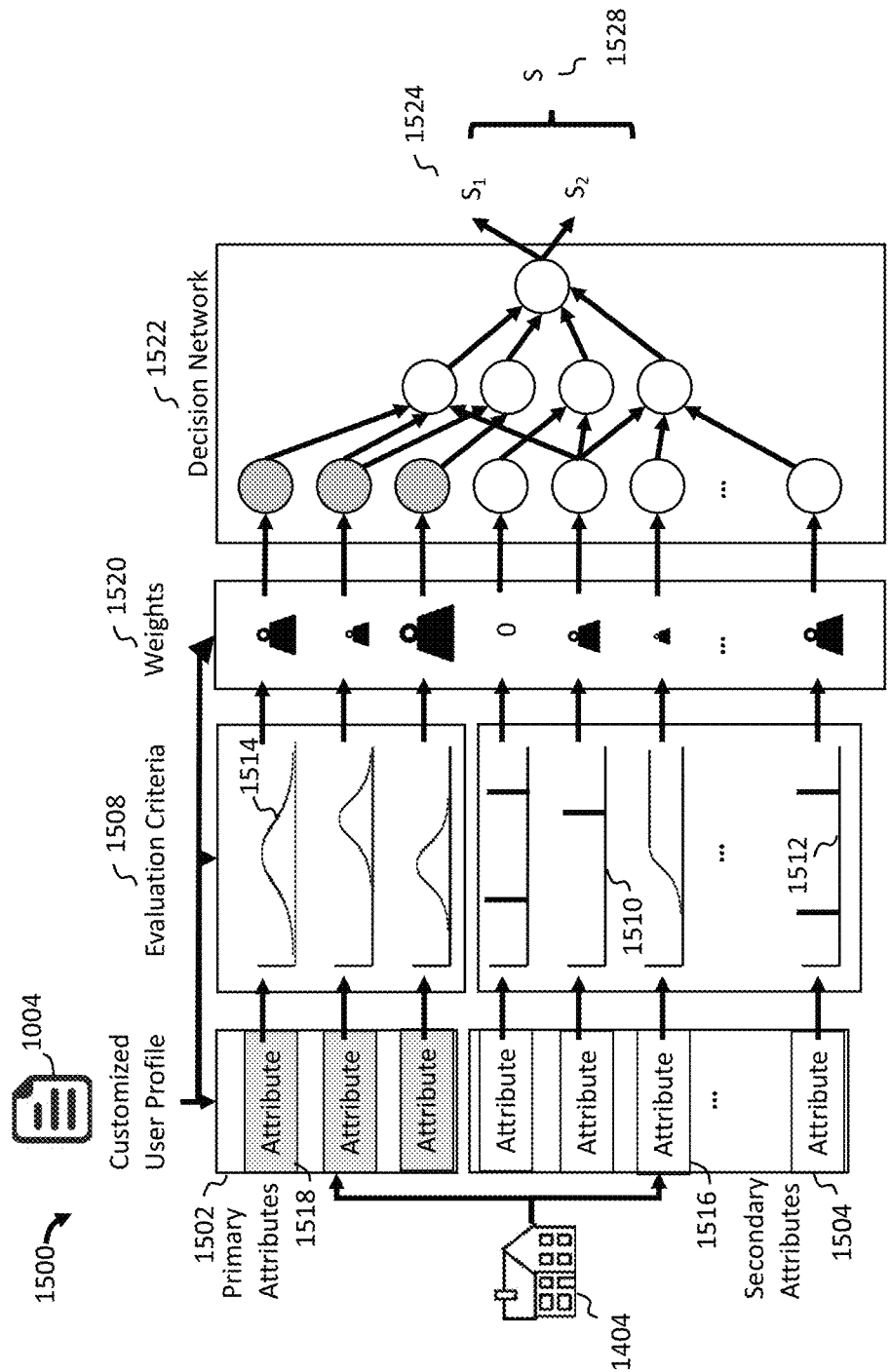
FIG. 15 depicts an embodiment of scoring an exemplary real estate property.

FIG. 15 depicts an exemplary process of calculating a single score for a real estate property based on preferences of seeking user 204, generally referenced by the numeral 1500. In some embodiments, collection of primary attributes 1502 and collection of secondary attributes 1504 of real estate property 1404 as determined in the process depicted in FIG. 14 may be mapped to evaluation criteria 1508. Each attribute in the customized user profile 1004 may be associated with at least one evaluation factor depicted in evaluation criteria 1508. Evaluation factors may be a single criterion, such as for example evaluation factor 1510. In some embodiments, evaluation factor 1510 matches the corresponding attribute score to receive a contribution of one unit. Multiple criteria, such as for example 1512, must match at least one corresponding attribute score to receive a contribution of one unit, or a probability distribution of numeric criteria, such as for example 1514, that receives a contribution equal to the probability distribution multiplied by the corresponding attribute score.

In some embodiments, each attribute in collection of primary attributes 1502 and collection of secondary attributes 1504 of real estate property 1404 may be assigned a single numeric score based on how well the attribute conforms to the metrics that indicate desirability. For example, attribute 1516 can have a metric of "unfulfilled", "partially fulfilled" or "fulfilled". The "fulfilled" state may not change no matter how many instances of the attribute there are. As an example, the attribute may be a 2-car garage. If real estate property 1404 includes no garage, the awarded value may be 0. If real estate property 1404 includes a 1-car garage, the attribute may be awarded a value of 1. If real estate property 1404 includes a 2-car garage, the attribute may be awarded value is 2 and if real estate property 1404 includes a 3-car garage, the attribute awarded value remains 2. In the case of primary attribute 1518, the attribute metric is "not present", "partially meeting the goal", "fully meeting the goal", and "too many instances of the attribute present", with corresponding desirability. An example of this may be a user that desires real estate property 1404 which is a down-town real estate property. In this case the attribute of a number of parking garages in proximity to real estate property 1404 may be primary attribute 1502. If there is 1 parking garage within a half-mile of real estate property 1404, the attribute value may decline because the specification was for at least 2, not 1 parking garage.

In some embodiments, the attributes, now prioritized by desirability, are associated with imputed weighted scores 1520. In some embodiments, the attributes, prioritized and weighted, may be further analyzed and combined into relevant groups of attributes by a decision network 1522. Decision network 1522 may be based on machine learning and artificial intelligence tools to create scoring that employs probability to predict user satisfaction. Decision network 1522 can result in a plurality of component scores 1524 that are combined in a single score 1528. For example, decision network 1522 can determine the contributions of primary and secondary scores separately.

Figure 16:
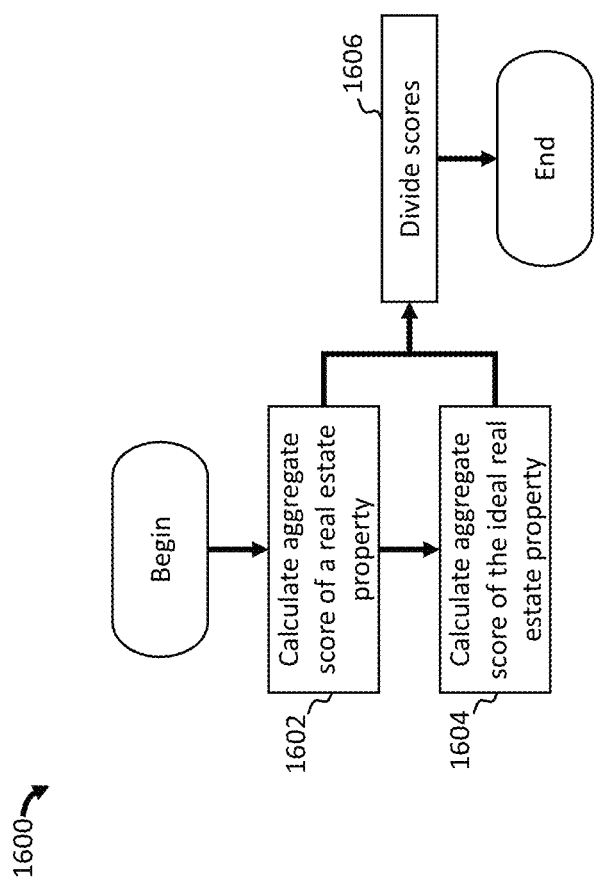
FIG. 16 depicts an exemplary process for calculating the relative non-monetary value of a real estate property.

FIG. 16 depicts an exemplary process for calculating the relative non-monetary value to a user seeking a real estate transaction represented generally by the reference numeral 1600. Initially, at step 1602, aggregate score of real estate property 1404 is calculated as depicted in FIG. 15. The calculated aggregate score may be indicative of the ability of real estate property 1404 to meet the user's real estate needs. At step 1604, a maximum achievable aggregate score may be calculated for a hypothetical ideal real estate property that optimally meets the user's real estate needs. At step 1606, the aggregate score calculated at step 1602 may be divided by the maximum achievable aggregate score calculated at step 1604. The result of the operation at step 1606 may be the relative non-monetary value to a user seeking (i.e., seeking user 204) a real estate transaction and represents the probability that the transaction meets the needs of the seeking user 204. Seeking user 204 may opt to use the relative non-monetary value to automatically screen offered transactions, and thus limit the number of transactions offered for review, or to be notified only when a newly offered real estate transaction meets a probability threshold.

Figure 17:
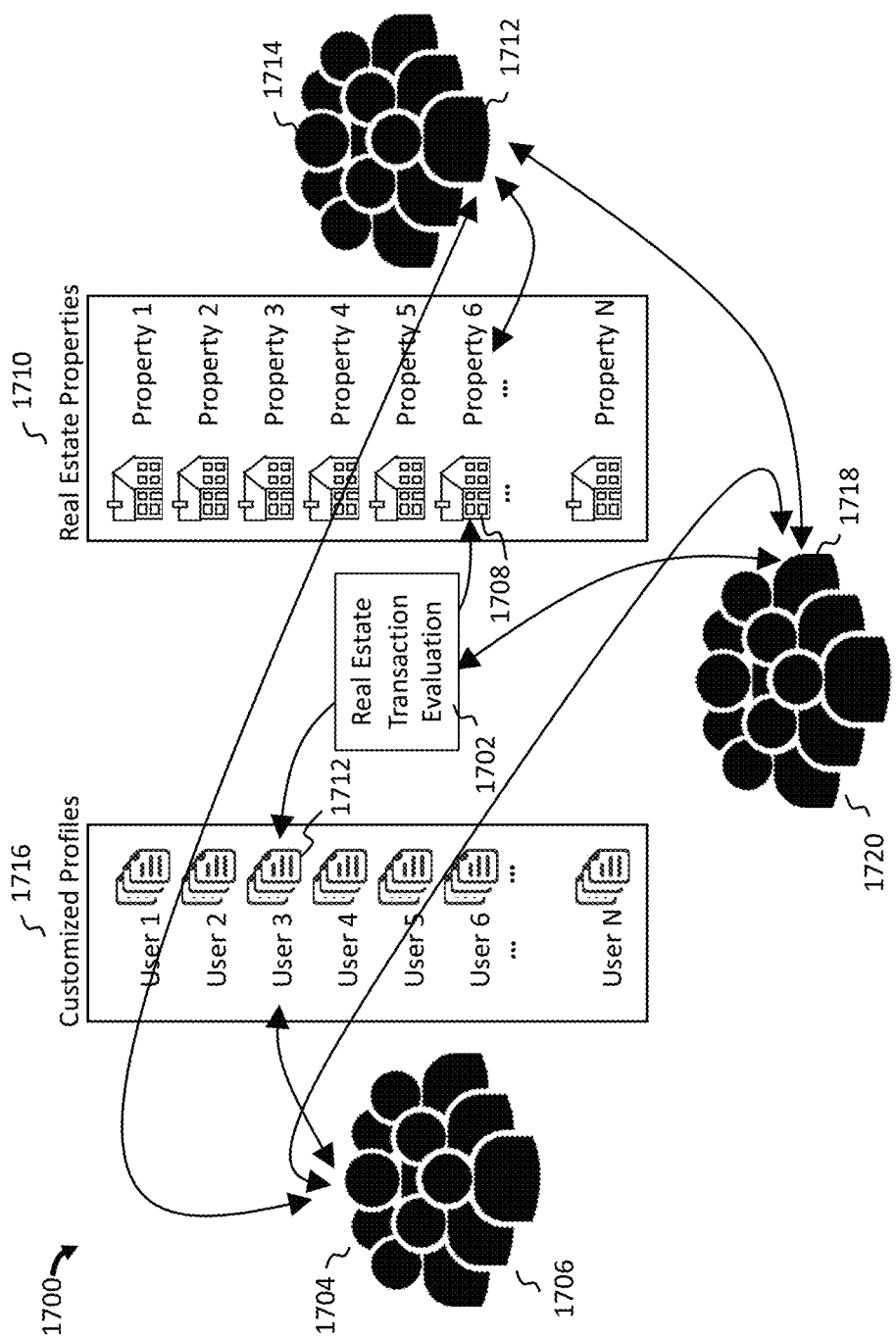
FIG. 17 depicts a process of connecting users seeking and offering real estate transactions.

Turning now to FIG. 17, a schematic depiction of a personal real estate system 1702 is depicted and referred to generally by reference numeral 1700. As depicted, personal real estate system 1702 may assist user 1704 among a pool of users 1706 interested in purchasing, leasing, using or otherwise occupying real estate, in identifying real estate property 1708 among a pool of real estate properties 1710, that achieves best and highest real estate use for user 1704 based on the customized profile 1716 of user 1704. In some embodiments, user 1704 is seeking user 204. User 1704 may provide user data to personal real estate system 1702 and personal real estate system 1702 may determine the needs and attributes and optimize a list of real estate properties that meets the highest and best use for user 1704 as described in embodiments above.

In some embodiments, personal real estate system 1702 may assist offering user 1712 among a pool of offering users 1714 interested in offering to sell, rent or otherwise occupy real estate in identifying customized profiles 1716 among the pool of customized profiles 1716 that achieves best and highest real estate use for user 1704 based on the customized profiles 1716 of user 1704. In some embodiments, offering user 1712 may be a real estate agent and may access and provide custom options to user 1704 based on the received information from personal real estate system 1702 as described in embodiments above.

In some embodiments, user 1704 or offering user 1712 may seek the advice, assistance, and/or any other service from user 1718 among a pool of service providers 1720 that facilitates, advises on, or otherwise accommodates a transaction between user 1704 and offering user 1712. The service provider may have intimate knowledge of personal real estate system 1702 and provide updates and maintenance and general assistance to user 1704 and offering user 1712. In some embodiments, user 1718 among the pool of service providers 1720 may offer advice, assistance, and/or any other service to user 1704 among the pool of users 1706 or to offering user 1712 among the pool of offering users 1714, to facilitate, advise on or otherwise accommodate a transaction between user 1718 and user 1704 and offering user 1712 individually, separately, or in combination.

In some embodiments, the personal real estate system 1702 may facilitate direct and unencumbered communication between users, businesses, professional and non-professional users, taking into account preferences, permissions and privacy controls set by each user.

Figure 18:
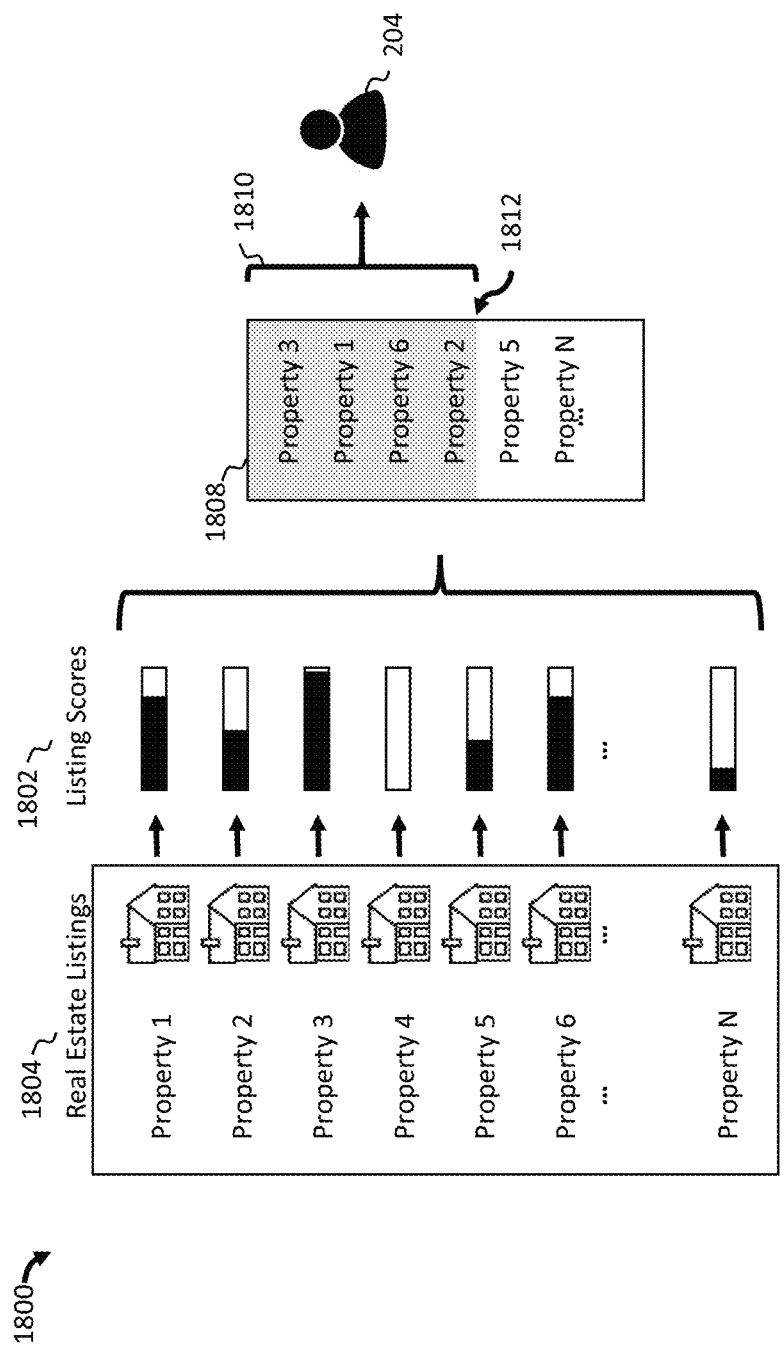
FIG. 18 depicts an embodiment of matching real estate properties with a seeking user based on relative scores.

Turning now to FIG. 18, where a process for matching real estate properties with a user is depicted and referred to generally by reference numeral 1800. The process uses the score of each real estate property 1802 in the real estate collection 1804 of real estate properties offered for sale, rent, or occupation based on the customized profile of seeking user 204 and optimization as described in embodiments above. A rank ordered list 1808 of real estate properties may be generated in the real estate collection 1804 such that a subset 1810 of real estate properties at top of rank ordered list 1808 achieves the highest and best use of real estate currently offered for seeking user 204 as described in the optimization processes described above. In some embodiments, seeking user 204 may set a threshold 1812 for the size of subset 1810, the minimum listing score, or any other criteria that limits the set of real estate properties offered to seeking user 204 for review. Threshold 1812 may be set by seeking user 204 or offering user 1712 such that they are not overwhelmed by the size of rank ordered list 1808.

Figure 19:
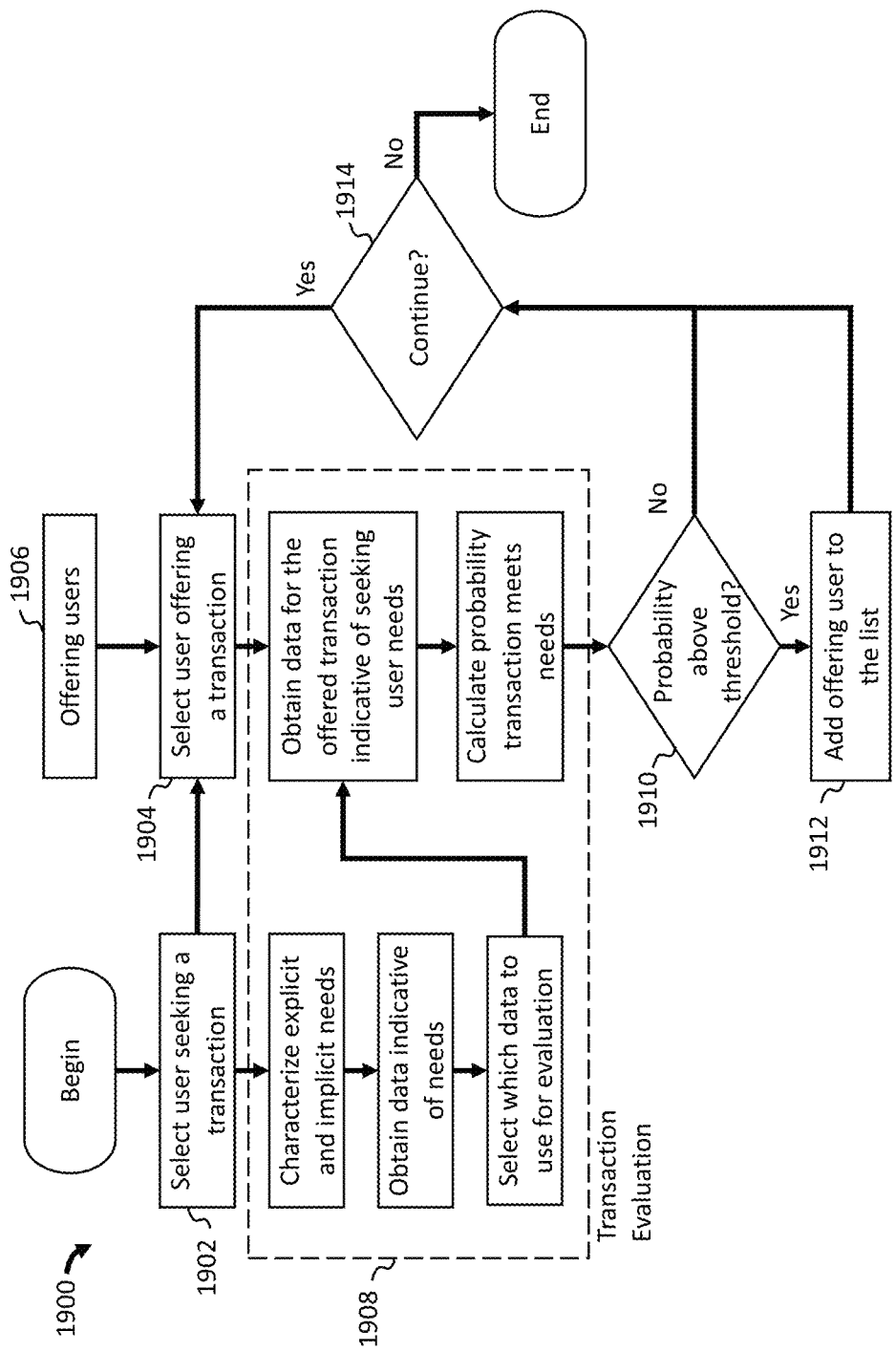
FIG. 19 depicts an exemplary process of connecting seeking users to offering users.

FIG. 19 depicts an exemplary process connecting a user seeking a real estate transaction to users offering a real estate transaction that meets a seeking user's threshold for the relative non-monetary value of a real estate transaction represented generally by the reference numeral 1900. Initially, at step 1902, a user is identified that seeks a real estate transaction. In some embodiments, the user may be seeking user 204. At step 1904, an offering user is selected from the pool of users 1906 that offer a real estate transaction. In some embodiments, the offering user may be offering user 1712. At step 1908, the potential transaction between seeking user 204 and offering user 1712 is evaluated as depicted in block 212 in FIG. 2. At step 1910, a check is performed to determine if the offered transaction meets the threshold of seeking user 204. If the offered transaction meets the threshold of seeking user 204, at step 1912, the offering user 1712 is added to a list of offering users. At step 1914, a determination is made by whether to continue the evaluation of more transactions. The determination may be based on stopping criteria specified by seeking user 204 and/or personal real estate system 1702 automating the process. For example, seeking user 204 may opt to evaluate all offered real estate transactions or only a sampling of transactions, or personal real estate system 1702 may enforce a maximum time limit for processing transaction evaluations and make determinations based on the user data of seeking user 204.

Figure 20:
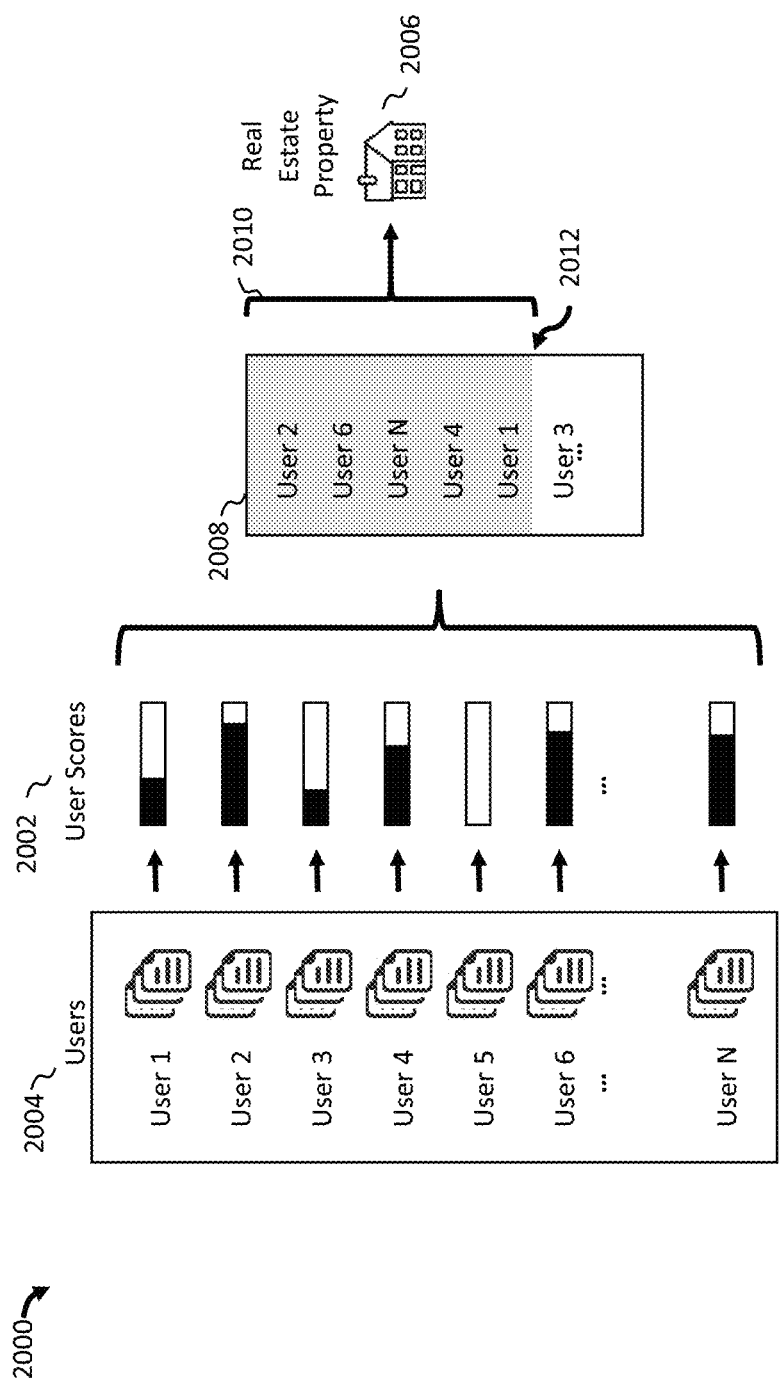
FIG. 20 depicts an embodiment of matching users to a property based on relative scores.

Turning now to FIG. 20, a process for matching a real estate property to users is depicted and referred to generally by reference numeral 2000. The process may use user scores 2002 of real estate property listing 2006 computed using the customized profiles of all individual users 2004 to generate a rank ordered list of users 2008 interested in real estate properties offered for sale, rent, or occupation such that users subset 2010 at the top of list of users 2008 achieves the highest and best use of real estate property 2006. In some embodiments, an owner or offeror of real estate property 2006 may elect to market real estate property 2006 to the subset of users 2008 at the top of rank ordered list of users 2008. Furthermore, the owner or real estate seller may use the user scores 2002 to evaluate the desirability or market value of real estate property 2006 or determine the change in desirability or market value of real estate property 2006 after making modifications, additions, improvements, or any other changes to the characteristics. In some embodiments, owner of real estate property 2006 may set a user threshold 2012 for the size of user subset 2010, the minimum user score, or any other criteria that limits the subset of users provided to the owner or offeror of real estate property 2006 for review or marketing. The real estate seller, or an offering user, may update the real estate property listing 2006 based on the recognized attributes of subset of user 2008 to market to specific users. In some embodiments, the offering user may update real estate property listing 2006 to market to a broader list of users based on seeking user attributes and information indicative of seeking user profiles presented the offering user.

Figure 21:
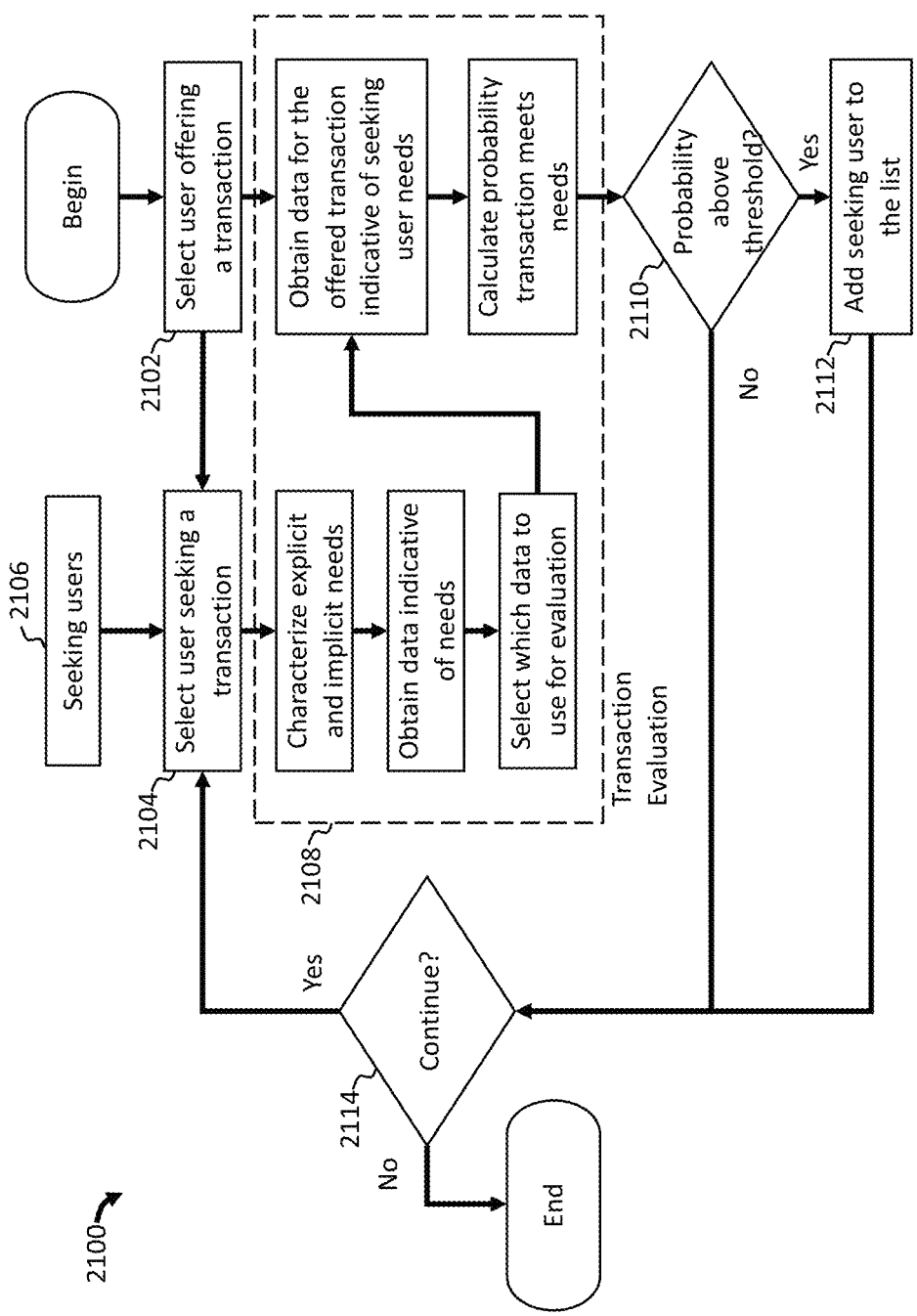
FIG. 21 depicts an exemplary process of connecting an offering user to a seeking user.

FIG. 21 depicts an exemplary process connecting a user offering a real estate transaction to users seeking a real estate transaction that meets a threshold for seeking user 204 for the relative non-monetary value of a real estate transaction represented generally by the reference numeral 2100. At step 2102, an offering user is identified that offers a real estate transaction. At step 2104, seeking user 204 is selected from the pool of users 2106 that seek a real estate transaction. At step 2108, the potential transaction between offering user 1712 and seeking user 204 may be evaluated as depicted in block 201 in FIG. 2. At step 2110, a check may be performed to determine if the offered transaction meets the threshold of seeking user 204. If the offered transaction meets the threshold, at step 2112, seeking user 204 may be added to a list of potential buyers. At step 2114, a determination is made whether to continue the evaluation of more transactions. The determination may be based on stopping criteria specified by offering user 1712 or personal real estate system 1702 automating the process. For example, offering user 1712 may opt to evaluate all seeking real estate transactions or only a sampling of transactions, or personal real estate system 1702 may enforce a maximum time limit for processing transaction evaluations. Offering user may receive information indicative of attributes associated with seeking user 204 and matching real estate that offering user is selling such that offering user may contact seeking user 204 to present real estate options.

Figure 22:
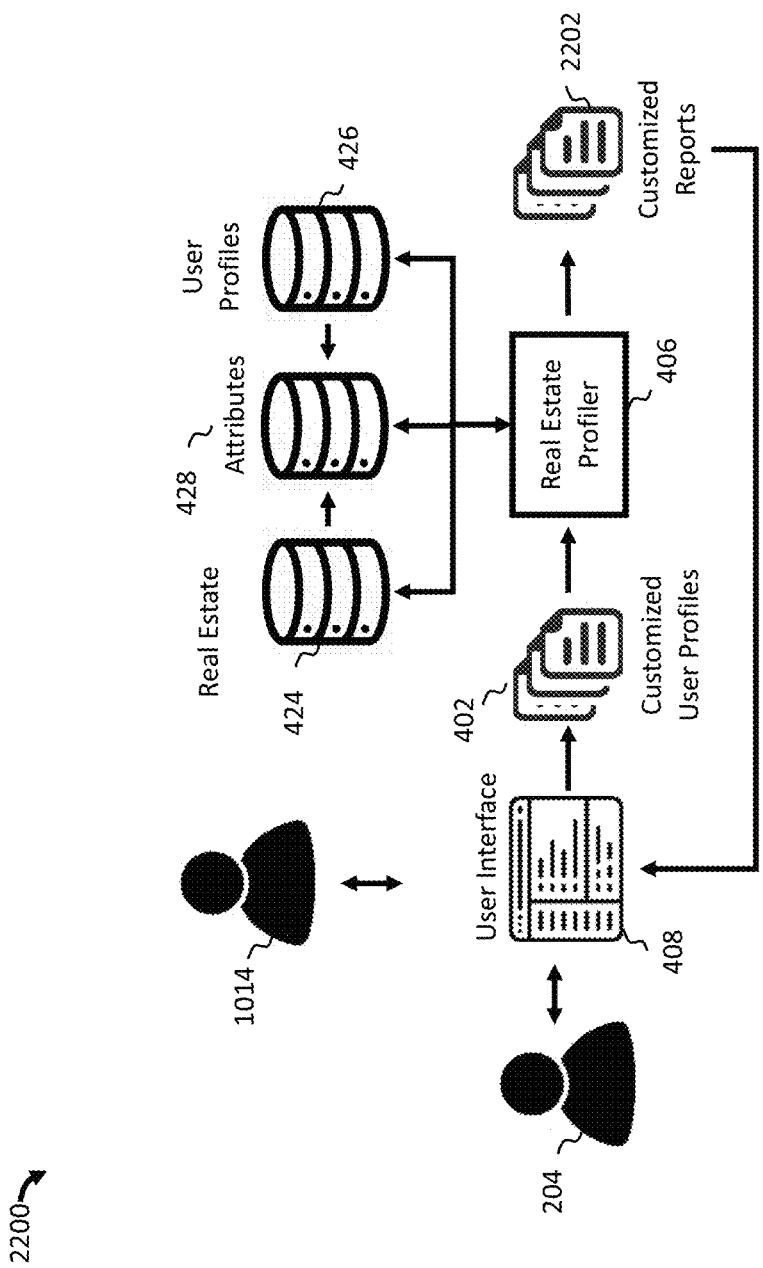
FIG. 22 shows an exemplary process of generating reports of results.

Turning now to FIG. 22, a flowchart illustrating the operation of a method of generating customized reports 2202 is depicted and referred to generally by reference numeral 2200. In some embodiments, seeking user 204 is assisted in evaluating current or future real estate and associated transactions for achieving best and highest real estate use. In some embodiments, seeking user 204 engages with user interface 408 to collect and update customized user profiles 402 of seeking user 204. In some embodiments, real estate profiler 406 compares customized user profiles 402 with profiles of other users stored in database of other user profiles 426, past and current real estate listings stored in real estate database 424, and real estate attributes 428 that map elements of customized user profiles 402 to features of past and current real estate listings stored in real estate database 424 to generate customized reports 2202 for seeking user 204. In some embodiments, user 204 may review customized reports 2202 through user interface 408 and may opt to add, remove, and/or update customized user profiles 402 to broaden or narrow the information provided by customized reports 2202. Furthermore, seeking user 204 may recognize and add information about the real estate listed in customized reports 2202 through personal real estate system 1702 processes, and/or may opt to pass on to, or share, with other user 1014 at least one customized report or seek the advice or services of other user 1014 or initiate other transactions related to the real estate listed in the results of customized reports 2202.

In some embodiments, customized reports 2202 may include an estimate of the relative market value or relative market rent of real estate owned, rented, or occupied by seeking user 204 based on the desirability of attributes identified in real estate owned by seeking user 204 as determined by the real estate profiler 406 based on user preferences observed in customized user profiles 402 and on the prevalence or scarcity of the desirable attributes identified in real estate owned by seeking user 204. In some embodiments, the customized reports 2202 may include comparable real estate properties that apply the estimated relative market value or market rent in perspective.

In some embodiments, customized reports 2202 may include information to assist seeking user 204 in making a stay-or-go decision. In some embodiments, real estate profiler 406 uses at least one customized user profile of seeking user 204 to identify real estate for sale, occupation, or rent that achieves higher and best use than the real estate currently owned, occupied, or rented by seeking user 204.

In some embodiments, customized reports 2202 may inform seeking user 204 on local trends in real estate attributes that may make real estate owned, rented, or occupied by seeking user 204 more or less desirable. In some embodiments, customized reports 2202 may assist seeking user 204 in choosing upgrades in real estate owned by seeking user 204 such as remodeling, and additions that have the best return in investment in terms of market value or that are an economical alternative to selling real estate owned by user 204 to achieve highest and best value.

In some embodiments, other user 1014 may be a user who owns or desires to own real estate or leases or desires to rent real estate or occupies or desires to occupy real estate. Other user 1014 may also be a professional, such as a real estate broker, real estate appraiser, mortgage broker, home repair technician, or any other individual providing services to assist seeking user 204 in achieving best and highest real estate use, or a business employing such professionals.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. One or more non-transitory computer readable media storing computer-executable instructions that, when executed by a processor, performs a method of determining non-monetary value of a real estate transaction and matching real estate property to attributes of a real estate seeker, the method comprising the steps of:
   receiving user data comprising explicit needs of the real estate seeker and lifestyle preferences;
   determining implicit needs of the real estate seeker comprising weighted lifestyle metrics based at least in part on the lifestyle preferences;
   receiving explicit real estate data indicative of available real estate;
   determining implicit real estate data;
   comparing real estate data indicative of the available real estate to the explicit needs and the implicit needs of the real estate seeker;
   analyzing a reference property for the real estate seeker independently of the available real estate;
   comparing geographic locations of the available real estate and the reference property to the weighted lifestyle metrics;
   calculating scores indicative of how well the implicit needs and the explicit needs of the real estate seeker are satisfied by the available real estate and the reference property based on the analyzing and the comparing,
   determining one or more real estate property options based on the scores;
   identifying the attributes of each explicit need and each implicit need of the real estate seeker;
   determining real estate seeker preferences for each attribute of the attributes;
   assigning a weight to each attribute based on the real estate seeker preferences; and
   further determining the one or more real estate property options based on the real estate seeker preferences for each attribute by:
     ranking the attributes as primary attributes and secondary attributes;
     wherein each primary attribute characterizes the explicit needs and the implicit needs of the real estate seeker,
     wherein each secondary attribute characterizes the explicit needs and the implicit needs of other real estate seekers;
     assigning primary weights to the primary attributes according to desirability based on the user data of the real estate seeker;
     assigning secondary weights to the secondary attributes according to desirability based on other user data of the other real estate seekers;
     updating the secondary weights to the secondary attributes according to desirable and undesirable based on the other user data of the other real estate seekers;
     identifying a set of real estate properties based on the primary attributes and the secondary attributes;

requesting that the real estate seeker review the set of real estate properties;

receiving feedback from the real estate seeker;

updating the primary weights of the primary attributes and the secondary weights of the secondary attributes based on the feedback; and requesting additional feedback until the real estate seeker signals satisfaction or indicates a desire to conclude, or when uncertainty ranges for the assigned primary weights reach acceptable bounds; and causing display of the one or more real estate property options and the scores of the one or more real estate property options and the reference property.

2. The media of claim 1, wherein the user data comprises desirable features including a fundamental real estate objective, a real estate history, proximity to a first location of community connections, proximity to a second location of desired needs associated with amenities, desirable interior features of the real estate property, desirable exterior features of the real estate property, and acceptable material facts.

3. The media of claim 1, wherein the user data comprises undesirable features including avoiding a fundamental real estate objective, avoiding a real estate history, proximity to a first location of undesired community connections, proximity to a second location of undesired amenities, undesirable interior features of the real estate property, undesirable exterior features of the real estate property, and unacceptable material facts.

4. The media of claim 1, wherein the computer-executable instructions are further executed to perform the steps of:
identifying each attribute based on description, location, and appearance; and
classifying each attribute as one of proximity, quality of life, comfort, appeal, effective age, or other.

5. The media of claim 4, wherein the computer-executable instructions are further executed to perform the step of identifying explicit attributes and implicit attributes based on at least one of real estate property listing, textual description, public information, user comment, or user rating.

6. The media of claim 4, wherein identifying the attributes based on the location further comprising the step of identifying geographic attributes based on user input related to community connections, geographic trends, and geographic material facts.

7. The media of claim 4, wherein the computer-executable instructions are further executed to perform the steps of:
receiving an image of a property from the real estate seeker;
receiving user input identifying desired features in the image;
identifying discrete attributes in the image;
classifying the discrete attributes as desirable or undesirable;
determining visual implicit attributes; and
prioritizing the classified discrete attributes based on the user input and the visual implicit attributes.

8. The media of claim 1, wherein the computer-executable instructions are further executed to perform the steps of:
identifying explicit priority;
determining implied priority of the attributes,
wherein the explicit priority is defined by the real estate seeker;
identifying implied user desirability based on the user data, industry trends, and community trends;
identifying implied connections of the attributes based on the identified implied user desirability; and
mapping the attributes of the identified implied user desirability to groupings descriptive of the identified implied user desirability.

9. The media of claim 1, wherein the computer-executable instructions are further executed to perform the steps of:
sorting the primary attributes and the secondary attributes according to a desirability indicated by the real estate seeker,
determining a relative desirability from desirability input by other users for a primary subset of the primary attributes and a secondary subset of the secondary attributes for which no desirability is indicated by the real estate seeker;
determining an augmented desirability by combining the desirability indicated by the real estate seeker and the relative desirability;
sorting the secondary attributes according to preferences of the real estate seeker; and
generating a table of the primary attributes and the secondary attributes such that the primary attributes are ranked higher than the secondary attributes based on the augmented desirability.

10. The media of claim 9, wherein the computer-executable instructions are further executed to perform the steps of:
receiving the real estate data indicative of the available real estate;
computing an aggregate score for the available real estate;
selecting a comparable set of the available real estate that have comparable scores; and
identifying primary real estate attributes that made a first significant contribution to the aggregate score and reducing said comparable set of the available real estate such that the reduced set of the available real estate comprises discriminating attributes with maximum discriminating power,
wherein reducing the comparable set of the available real estate further comprises the steps of:
identifying a second set of primary real estate attributes that made a second significant contribution to the aggregate score of the available real estate in the set of the available real estate;
selecting a first subset of the available real estate that have most distinct primary real estate attribute scores;
identifying secondary real estate attributes that made a third significant contribution to the aggregate score of the available real estate in the set of the real estate;
selecting a second subset of the available real estate that have the most distinct secondary attribute scores; and
combining the first subset of the available real estate and the second subset of the available real estate.

11. The media of claim 9, wherein the computer-executable instructions are further executed to perform the steps of:
receiving, from the real estate seeker, a real estate rating;
receiving, from the real estate seeker, a primary rating for each most distinct primary attribute in the primary subset of the primary attributes;
receiving, from the real estate seeker, a secondary rating for each most distinct secondary attribute in the secondary subset of the secondary attributes;
making the real estate rating, the primary rating, and the secondary rating available for reranking and reweighting the preferences; and redesignating the rated secondary real estate attributes as new primary real estate attributes.

12. A method of determining non-monetary value of a real estate transaction and matching real estate property to attributes of a real estate seeker, the method comprising the steps of:
receiving user data comprising explicit needs of the real estate seeker and lifestyle preferences;
determining implicit needs of the real estate seeker comprising weighted lifestyle metrics based at least in part on the lifestyle preferences;
receiving explicit real estate data indicative of available real estate;
determining implicit real estate data;
comparing real estate data indicative of the available real estate to the explicit needs and the implicit needs of the real estate seeker;
analyzing a reference property for the real estate seeker independently of the available real estate;
comparing geographic locations of the available real estate and the reference property to the weighted lifestyle metrics;
calculating scores indicative of how well the implicit needs and the explicit needs of the real estate seeker are satisfied by the available real estate and the reference property based on the analyzing and the comparing,
determining one or more real estate property options based on the scores;
identifying the attributes of each explicit need and each implicit need of the real estate seeker;
determining real estate seeker preferences for each attribute of the attributes;
assigning a weight to each attribute based on the real estate seeker preferences;
further determining the one or more real estate property options based on the real estate seeker preferences for each attribute by:
ranking the attributes as primary attributes and secondary attributes;
wherein each primary attribute characterizes the explicit needs and the implicit needs of the real estate seeker,
wherein each secondary attribute characterizes the explicit needs and the implicit needs of other real estate seekers;
assigning primary weights to the primary attributes according to desirability based on the user data of the real estate seeker;
assigning secondary weights to the secondary attributes according to desirability based on other user data of the other real estate seekers;
updating the secondary weights to the secondary attributes according to desirable and undesirable based on the other user data of the other real estate seekers;
identifying a set of real estate properties based on the primary attributes and the secondary attributes;
requesting that the real estate seeker review the set of real estate properties;
receiving feedback from the real estate seeker;
updating the primary weights of the primary attributes and the secondary weights of the secondary attributes based on the feedback; and
requesting additional feedback until the real estate seeker signals satisfaction or indicates a desire to conclude, or when uncertainty ranges for the assigned weights reach acceptable bounds; and
causing display of the one or more real estate property options and the scores of the one or more real estate property options and the reference property.

13. The method of claim 12, further comprising the steps of:
receiving updated explicit needs and updated implicit needs of the real estate seeker;
comparing the real estate data indicative of the available real estate to the updated explicit needs and the updated implicit needs of the real estate seeker;
matching the real estate seeker with an updated one or more real estate property options based on the comparison; and
causing display of the updated one or more real estate property options to the real estate seeker.

14. The method of claim 12, further comprising the steps of:
identifying real estate attributes of the available real estate from a plurality of data sources;
mapping each attribute characterizing the explicit needs and the implicit needs of the real estate seeker to the real estate attributes;
identifying a set of real estate attributes determined to be desirable or undesirable that do not map to attributes characterizing the explicit needs and the implicit needs for real estate use or benefit; and
identifying material facts of the available real estate.

15. The method of claim 14, further comprising the steps of:
calculating an aggregate score of the available real estate meeting the explicit needs and the implicit needs of the real estate seeker;
calculating a maximum achievable aggregate score of a hypothetical ideal real estate property that optimally meets the explicit needs and the implicit needs of the real estate seeker; and
determining a probability that the real estate transaction achieves the explicit needs and the implicit needs of the real estate seeker by dividing the aggregate score of the available real estate by the maximum achievable aggregate score of the hypothetical ideal real estate property that optimally meets the explicit needs and the implicit needs of the real estate seeker.

16. The method of claim 12, further comprising the steps of:
identifying real estate attributes of the available real estate from a plurality of data sources;
creating a real estate relationship profile of the real estate seeker comprising the user data including the attributes;
mapping the real estate attributes to the attributes in the real estate relationship profile;
determining a compliance level of each attribute based on the real estate relationship profile;
calculating a contribution of each real estate attribute to an aggregate score of the available real estate based on a weight assigned to each attribute; and
calculating the aggregate score of the available real estate by summing the contribution of each attribute score.

17. A system for determining non-monetary value of a real estate transaction and matching real estate property to attributes of a real estate seeker, the system comprising:
a data store;
a processor; and
one or more non-transitory computer readable media storing computer-executable instructions that, when executed by the processor, performs a method of determining the non-monetary value of the real estate transaction and matching the real estate property to the attributes of the real estate seeker, the method comprising the steps of:

receiving user data comprising explicit needs of the real estate seeker and lifestyle preferences;

determining implicit needs of the real estate seeker comprising weighted lifestyle metrics based at least in part on the lifestyle preferences;

receiving real estate data indicative of available real estate;

analyzing a reference property for the real estate seeker independently of the available real estate;

comparing geographic locations of the available real estate and the reference property to the weighted lifestyle metrics;

calculating scores indicative of how well the implicit needs and the explicit needs of the real estate seeker are satisfied by the available real estate and the reference property based on the analyzing and the comparing;

identifying the attributes of each explicit need and each implicit need of the real estate seeker;

determining real estate seeker preferences for each attribute of the attributes;

assigning a weight to each attribute based on the real estate seeker preferences;

determining one or more real estate property options based on the scores and on the real estate seeker preferences for each attribute by:

ranking the attributes as primary attributes and secondary attributes;

wherein each primary attribute characterizes the explicit needs and the implicit needs of the real estate seeker, wherein each secondary attribute characterizes the explicit needs and the implicit needs of other real estate seekers;

assigning primary weights to the primary attributes according to desirability based on the user data of the real estate seeker;

assigning secondary weights to the secondary attributes according to desirability based on other user data of the other real estate seekers;

updating the secondary weights to the secondary attributes according to desirable and undesirable based on the other user data of the other real estate seekers;

identifying a set of real estate properties based on the primary attributes and the secondary attributes;

requesting that the real estate seeker review the set of real estate properties;

receiving feedback from the real estate seeker;

updating the primary weights of the primary attributes and the secondary weights of the secondary attributes based on the feedback; and requesting additional feedback until the real estate seeker signals satisfaction or indicates a desire to conclude, or when uncertainty ranges for the assigned weights reach acceptable bounds; and causing display of the one or more real estate property options.

18. The system of claim 17, wherein the computer-executable instructions are further executed to perform the steps of:

creating a real estate relationship profile of the real estate seeker comprising the user data including the attributes;

mapping real estate attributes to the attributes in the real estate relationship profile;

determining a compliance level of each attribute based on the real estate relationship profile;

calculating a contribution of each real estate attribute to an aggregate score of the available real estate based on a weight the real estate seeker assigned to each attribute;

calculating the aggregate score of the available real estate by summing the contribution of each attribute scores;

determining the one or more real estate property options based on the aggregate score; and causing display of the one or more real estate property options to the real estate seeker.

19. The system of claim 17, wherein the computer-executable instructions are further executed to perform the steps of:

receiving a real estate property listing from a real estate offeror;

presenting, to the real estate offeror, at least one seeking user with desirable attributes corresponding to the real estate property listing; and receiving, from the real estate offeror, an updated listing description based on a profile of the at least one seeking user.

* * * * *